US012634815B2

(12) United States Patent
Luo et al.

(10) Patent No.: US 12,634,815 B2
(45) Date of Patent: May 19, 2026

(54) NETWORK ENERGY SAVING MANAGEMENT METHOD, APPARATUS, AND SYSTEM

(71) Applicant: HUAWEI TECHNOLOGIES CO., LTD., Shenzhen (CN)

(72) Inventors: Ronghui Luo, Shanghai (CN); Ruiyue Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 448 days.

(21) Appl. No.: 18/316,472

(22) Filed: May 12, 2023

(65) Prior Publication Data

US 2023/0284133 A1      Sep. 7, 2023

Related U.S. Application Data

(63) Continuation of application No. PCT/CN2021/109993, filed on Aug. 2, 2021.

(30) Foreign Application Priority Data

Nov. 13, 2020    (CN) .......................... 202011273148.4

(51) Int. Cl.
*H04W 52/02*              (2009.01)
(52) U.S. Cl.
CPC ................................ *H04W 52/0206* (2013.01)
(58) Field of Classification Search
CPC ......... H04W 52/0206; H04W 52/0277; H04W 52/0296; H04W 52/0203; H04W 24/02; H04L 12/12; H04L 41/044; H04L 41/0833; H04L 41/34; Y02D 30/70
See application file for complete search history.

(56) References Cited

U.S. PATENT DOCUMENTS

| | | | |
|---|---|---|---|
| 2012/0244869 A1 | 9/2012 | Song et al. | |
| 2014/0220953 A1* | 8/2014 | Xia ........................ | H04W 52/26 |
| | | | 455/418 |
| 2016/0286482 A1* | 9/2016 | Zheng ............... | H04W 52/0206 |
| 2019/0014537 A1* | 1/2019 | Magnusson ........... | H04W 24/10 |

FOREIGN PATENT DOCUMENTS

| | | | | | |
|---|---|---|---|---|---|
| CN | 102045819 A | * | 5/2011 | ........ | H04W 52/0206 |
| CN | 106576275 A | * | 4/2017 | ........ | H04W 36/0033 |
| CN | 110825212 A | | 2/2020 | | |

(Continued)

OTHER PUBLICATIONS

3GPP TS 28.312 V0.1.0, "3rd Generation Partnership Project; Technical Specification Group Services and System Aspects; Management and orchestration; Intent driven management services for mobile networks (Release 17 )," Sep. 2020, 10 pages.

(Continued)

*Primary Examiner* — Mohammad S Adhami
*Assistant Examiner* — Vladislav Y Agureyev
(74) *Attorney, Agent, or Firm* — Fish & Richardson P.C.

(57) ABSTRACT

A network energy saving management method includes: A first network management unit determines network energy saving scope information and a first network energy saving mode, and sends a first energy saving control message to a second network management unit, where the first energy saving control message includes the network energy saving scope information and the first network energy saving mode.

20 Claims, 8 Drawing Sheets

(56) References Cited

FOREIGN PATENT DOCUMENTS

| | | | | |
|----|----------------------|---|--------|-------------------|
| EP | 2566256 | A1 | 3/2013 | |
| EP | 2683113 | A1 * | 1/2014 | .......... H04J 14/0221 |
| JP | 2013527692 | A | 6/2013 | |
| JP | 2014509166 | A | 4/2014 | |
| JP | 2020074527 | A | 5/2020 | |
| WO | WO-2013127422 | A1 * | 9/2013 | ........ H04W 52/0254 |
| WO | WO-2014000283 | A1 * | 1/2014 | ........... H04W 24/02 |
| WO | WO-2017129238 | A1 * | 8/2017 | ........... H04W 72/20 |

OTHER PUBLICATIONS

Office Action in Japanese Appln. No. 2023-528387, mailed on May 21, 2024, 19 pages (with English translation).

3GPP TS 32.551 V15.0.0, "3rd Generation Partnership Project; Technical Specification Group Services and System Aspects; Tele-communication management; Energy Saving Management (ESM); Concepts and requirements (Release 15)," Jun. 2018, 26 pages.

3GPP TR 28.812 V0.10.0, "3rd Generation Partnership Project; Technical Specification Group Services and System Aspects; Tele-communication management; Study on scenarios for Intent driven management services for mobile networks (Release 16)," Mar. 2020, 48 pages.

3GPP TS 28.313 V0.5.0, "3rd Generation Partnership Project; Technical Specification Group Services and System Aspects; Man-agement and orchestration; Self-Organizing Networks (SON) for 5G networks (Release 16)," Jun. 2020, 45 pages.

International Search Report and Written Opinion in International Appln. No. PCT/CN2021/109993, mailed on Oct. 29, 2021, 16 pages (with English translation).

* cited by examiner

400

500

600

700

NETWORK ENERGY SAVING MANAGEMENT METHOD, APPARATUS, AND SYSTEM

CROSS-REFERENCE TO RELATED APPLICATIONS

This is a continuation of International Application No. PCT/CN2021/109993, filed on Aug. 2, 2021, which claims priority to Chinese Patent Application No. 202011273148.4, filed on Nov. 13, 2020. The disclosures of the aforementioned applications are hereby incorporated by reference in their entireties.

TECHNICAL FIELD

This disclosure relates to the field of network management technologies, and in particular, to a network energy saving management method, apparatus, and system.

BACKGROUND

With gradual application of large-scale active antenna arrays and large-scale construction of 5th generation ($5^{th}$ generation, 5G) mobile networks, energy consumption of wireless communication networks is greatly increased, and an energy consumption cost growth rate even exceeds an operator revenue growth rate.

Therefore, network energy saving management needs to be performed to achieve a network energy saving effect, thereby obtaining a network benefit. However, network energy saving management may cause a specific loss to network performance. For example, a network latency is increased and user experience is reduced. Although a current network energy saving management method may meet an expected requirement at the beginning, as time elapses and a network operating status changes, a phenomenon of "excessive" energy saving gradually occurs, that is, a network performance loss exceeds an expectation; or a phenomenon of "inadequate" energy saving gradually occurs, that is, a network energy saving effect is lower than an expectation. Therefore, how to effectively perform network energy saving management to enable the network energy saving effect and the network performance loss to continuously meet a given requirement is a problem that needs to be resolved in this disclosure.

SUMMARY

This disclosure provides a network energy saving management method, apparatus, and system, to balance a relationship between a network energy saving effect and a network performance loss.

According to a first aspect, a network energy saving management method is provided, executed by a first network management unit. The method includes: determining network energy saving scope information and a first network energy saving mode, where the network energy saving scope information is for determining a target network node set, the target network node set includes one or more network nodes that are to perform an energy saving operation, and the first network energy saving mode indicates a first requirement on network energy saving effect of the target network node set and a network performance loss of the target network node set; sending a first energy saving control message to a second network management unit, where the first energy saving control message includes the network energy saving scope information and the first network energy saving mode.

In this aspect, the first network management unit delivers the first energy saving control message, so that the second network management unit triggers, based on the first energy saving control message, the target network node set to perform the energy saving operation. Therefore, the network energy saving effect and the network performance loss can continuously meet a specified requirement, and a telecommunications operator can balance a relationship between the network energy saving effect and the network performance loss in general.

In a possible implementation, the method further includes: receiving an energy saving control result from the second network management unit, where the energy saving control result is a result of performing energy saving control on the target network node set.

In this implementation, the first network management unit may obtain the energy saving control result sent by the second network management unit, to accurately learn whether the network energy saving effect of the target network node set and the network performance loss of the target network node set meet the network energy saving mode sent by the first network management unit.

In another possible implementation, the receiving an energy saving control result from the second network management unit includes: receiving an energy saving feedback message from the second network management unit, where the energy saving feedback message includes the energy saving control result.

In still another possible implementation, the method further includes: sending a second energy saving control message to the second network management unit based on the energy saving control result, where the second energy saving control message includes a second network energy saving mode, and the second network energy saving mode indicates a second requirement on the network energy saving effect of the target network node set and the network performance loss of the target network node set.

In this implementation, the first network management unit receives the energy saving control result, and may resend the energy saving control message to the second network management unit based on the energy saving control result. For example, if information included in the energy saving control result indicates that the network energy saving effect of the target network node set and the network performance loss of the target network node set do not meet the first network energy saving mode or a difference between the network energy saving effect of the target network node set and the network performance loss of the target network node set and the first network energy saving mode is greater than or equal to a preset threshold, the first network management unit may change the network energy saving mode, and resend the energy saving control message. This may be considered as large closed-loop control of a network energy saving management system.

In yet another possible implementation, the method further includes: receiving energy saving control capability information from the second network management unit, where the energy saving control capability information includes at least one network energy saving mode supported by the second network management unit; and the determining a first network energy saving mode includes: selecting a network energy saving mode as the first network energy saving mode from the at least one network energy saving mode supported by the second network management unit.

In this implementation, the first network management unit may receive the energy saving control capability information reported by the second network management unit, and select the network energy saving mode as the first network energy saving mode from the at least one network energy saving mode supported by the second network management unit, so that the delivered first network energy saving mode can be used by the second network management unit.

According to a second aspect, a network energy saving management method is provided, executed by a second network management unit. The method includes: receiving a first energy saving control message sent by a first network management unit, where the first energy saving control message includes network energy saving scope information and a first network energy saving mode, the network energy saving scope information is for determining a target network node set, the target network node set includes one or more network nodes that are to perform an energy saving operation, and the first network energy saving mode indicates a first requirement on network energy saving effect of the target network node set and a network performance loss of the target network node set; and triggering, based on the first energy saving control message, the target network node set to perform the energy saving operation, so that the network energy saving effect of the target network node set and the network performance loss of the target network node set meet the first network energy saving mode.

In this aspect, the second network management unit triggers, based on the first energy saving control message delivered by the first network management unit, the target network node set to perform the energy saving operation. Therefore, the network energy saving effect and the network performance loss can continuously meet a specified requirement, and a telecommunications operator can balance a relationship between the network energy saving effect and the network performance loss in general.

In a possible implementation, the triggering, based on the first energy saving control message, the target network node set to perform the energy saving operation includes: forwarding the first energy saving control message to a network management unit of the target network node set. In this implementation, the network management unit of the target network node set may determine a first network configuration parameter based on the first energy saving control message and service scenario information of the network node in the target network node set.

In another possible implementation, the triggering, based on the first energy saving control message, the target network node set to perform the energy saving operation includes: obtaining first service scenario information of the network node in the target network node set; determining a first network configuration parameter based on the first network energy saving mode and the first service scenario information, where the first network configuration parameter is for enabling the network node in the target network node set to operate in an energy saving working state; and sending a first network configuration instruction to the network node in the target network node set or a management unit of the network node in the target network node set, where the first network configuration instruction includes the first network configuration parameter.

In this implementation, in a network energy saving management process, service scenario information of the network node may change. The second network management unit may determine the first network configuration parameter based on the first network energy saving mode and the first service scenario information, to accurately deliver the first network configuration instruction to the target network node set, so that the network energy saving effect of the target network node set and the network performance loss of the target network node set meet the first network energy saving mode.

In still another possible implementation, the obtaining first service scenario information of the network node in the target network node set includes: receiving first network service data sent by the network node in the target network node set, where the first network service data includes a network configuration, a network topology, and network performance; and obtaining the first service scenario information based on the first network service data.

In this implementation, the service scenario information of the network node may be identified based on the network service data of the network node.

In yet another possible implementation, the determining a first network configuration parameter based on the first network energy saving mode and the first service scenario information includes: determining the first network configuration parameter based on the first network energy saving mode, the first service scenario information, and a pre-stored association relationship among service scenario information, a network energy saving mode, and a network configuration parameter.

In this implementation, there may be the preset association relationship among the service scenario information, the network energy saving mode, and the network configuration parameter. The association relationship may be obtained through training by using a neural network model or the like.

In still yet another possible implementation, the triggering, based on the first energy saving control message, the target network node set to perform the energy saving operation further includes: obtaining second service scenario information of the network node in the target network node set; determining a second network configuration parameter based on the first network energy saving mode and the second service scenario information, where the second network configuration parameter is for enabling the network node in the target network node set to operate in the energy saving working state; and sending a second network configuration instruction to the network node in the target network node set or the management unit of the network node in the target network node set, where the second network configuration instruction includes the second network configuration parameter.

In this implementation, when a service scenario of the network node changes, the second network management unit needs to re-determine the network configuration parameter based on the first network energy saving mode and the updated service scenario information, to accurately deliver the second network configuration instruction to the target network node set, so that the network energy saving effect of the target network node set and the network performance loss of the target network node set meet the first network energy saving mode. This may be considered as small closed-loop control between the second network management unit and the target network node set.

In a further possible implementation, before the receiving a first energy saving control message sent by a first network management unit, the method further includes: sending energy saving control capability information to the first network management unit, where the energy saving control capability information includes at least one network energy saving mode supported by the second network management unit.

In a still further possible implementation, the method further includes: sending an energy saving control result to the first network management unit, where the energy saving control result is a result of performing energy saving control on the target network node set.

In a yet further possible implementation, the sending an energy saving control result to the first network management unit includes: sending an energy saving feedback message to the first network management unit, where the energy saving feedback message includes the energy saving control result.

In a still yet further possible implementation, the method further includes: receiving a second energy saving control message sent by the first network management unit, where the second energy saving control message includes a second network energy saving mode, and the second network energy saving mode indicates a second requirement on the network energy saving effect of the target network node set and the network performance loss of the target network node set; and triggering, based on the second energy saving control message, the target network node set to perform the energy saving operation, so that the network energy saving effect of the target network node set and the network performance loss of the target network node set meet the second network energy saving mode.

According to a third aspect, a network energy saving management method is provided, executed by a network node in a target network node set. The method includes: receiving a first network configuration instruction from a second network management unit or a management unit of the network node, where the first network configuration instruction includes a first network configuration parameter, and the first network configuration parameter is for enabling the network node in the target network node set to operate in an energy saving working state; and executing the first network configuration instruction, so that network energy saving effect of the target network node set and a network performance loss of the target network node set meet a first network energy saving mode.

In this aspect, the network node in the target network node set receives the first network configuration instruction, and executes the first network configuration instruction. Therefore, the network energy saving effect and the network performance loss can continuously meet a specified requirement, and a telecommunications operator can balance a relationship between the network energy saving effect and the network performance loss in general.

In a possible implementation, the method further includes: sending first network service data to the second network management unit or the management unit of the network node, where the first network service data includes a network configuration, a network topology, and network performance.

In another possible implementation, the method further includes: sending energy consumption and/or network performance of the network node to the second network management unit or the management unit of the network node.

According to a fourth aspect, a network energy saving management apparatus is provided, and is configured to perform the method in any one of the first aspect or the possible implementations of the first aspect. The network energy saving management apparatus may be the first network management unit in any one of the first aspect or the possible implementations of the first aspect, or a module used in the first network management unit, for example, a chip or a chip system. The network energy saving management apparatus includes a corresponding module, unit, or means (means) for implementing the foregoing method. The module, unit, or means may be implemented by using hardware, software, or hardware executing corresponding software. The hardware or the software includes one or more modules or units corresponding to the foregoing function.

With reference to the fourth aspect, in a possible implementation, the network energy saving management apparatus includes a processing unit and a transceiver unit. The processing unit is configured to determine network energy saving scope information and a first network energy saving mode, where the network energy saving scope information is for determining a target network node set, the target network node set includes one or more network nodes that are to perform an energy saving operation, and the first network energy saving mode indicates a first requirement on network energy saving effect of the target network node set and a network performance loss of the target network node set. The transceiver unit is configured to send a first energy saving control message to a second network management unit, where the first energy saving control message includes the network energy saving scope information and the first network energy saving mode.

Optionally, the transceiver unit is further configured to receive an energy saving control result from the second network management unit, where the energy saving control result is a result of performing energy saving control on the target network node set.

Optionally, the transceiver unit is further configured to receive an energy saving feedback message from the second network management unit, where the energy saving feedback message includes the energy saving control result.

Optionally, the transceiver unit is further configured to send a second energy saving control message to the second network management unit based on the energy saving control result, where the second energy saving control message includes a second network energy saving mode, and the second network energy saving mode indicates a second requirement on the network energy saving effect of the target network node set and the network performance loss of the target network node set.

Optionally, the transceiver unit is further configured to receive energy saving control capability information from the second network management unit, where the energy saving control capability information includes at least one network energy saving mode supported by the second network management unit; and the processing unit is configured to select a network energy saving mode as the first network energy saving mode from the at least one network energy saving mode supported by the second network management unit.

In another possible implementation, the network energy saving management apparatus includes a processor, a memory, and instructions that are stored in the memory and that can be run on the processor. When the instructions are run, the network energy saving management apparatus is enabled to perform the method in any one of the first aspect or the possible implementations of the first aspect.

In still another possible implementation, the network energy saving management apparatus includes at least one processor and a communication interface, configured to perform the method in any one of the first aspect or the possible implementations of the first aspect. Specifically, the at least one processor communicates with the outside through the communication interface. The at least one processor is configured to run a computer program, so that the network energy saving management apparatus performs the method in any one of the first aspect or the possible implementations of the first aspect. It may be understood that the outside may be an object other than the processor, or an object other than the network energy saving management apparatus.

In yet another possible design, the network energy saving management apparatus is a chip or a chip system. The communication interface may be an input/output interface, an interface circuit, an output circuit, an input circuit, a pin, a related circuit, or the like in the chip or the chip system. The processor may alternatively be embodied as a processing circuit or a logic circuit.

For technical effects achieved in any design of the fourth aspect, refer to technical effects achieved in different designs of the first aspect. Details are not described herein again.

According to a fifth aspect, a network energy saving management apparatus is provided, and is configured to perform the method in any one of the second aspect or the possible implementations of the second aspect. The network energy saving management apparatus may be the second network management unit in any one of the second aspect or the possible implementations of the second aspect, or a module used in the second network management unit, for example, a chip or a chip system. The network energy saving management apparatus includes a corresponding module, unit, or means for implementing the foregoing method. The module, unit, or means may be implemented by using hardware, software, or hardware executing corresponding software. The hardware or the software includes one or more modules or units corresponding to the foregoing function.

With reference to the fifth aspect, in a possible implementation, the network energy saving management apparatus includes a transceiver unit and a processing unit. The transceiver unit is configured to receive a first energy saving control message sent by a first network management unit, where the first energy saving control message includes network energy saving scope information and a first network energy saving mode, the network energy saving scope information is for determining a target network node set, the target network node set includes one or more network nodes that are to perform an energy saving operation, and the first network energy saving mode indicates a first requirement on network energy saving effect of the target network node set and a network performance loss of the target network node set. The processing unit is configured to trigger, based on the first energy saving control message, the target network node set to perform the energy saving operation, so that the network energy saving effect of the target network node set and the network performance loss of the target network node set meet the first network energy saving mode.

Optionally, the transceiver unit is further configured to forward the first energy saving control message to a network management unit of the target network node set.

Optionally, the processing unit is further configured to obtain first service scenario information of the network node in the target network node set. The processing unit is further configured to determine a first network configuration parameter based on the first network energy saving mode and the first service scenario information, where the first network configuration parameter is for enabling the network node in the target network node set to operate in an energy saving working state. The transceiver unit is further configured to send a first network configuration instruction to the network node in the target network node set or a management unit of the network node in the target network node set, where the first network configuration instruction includes the first network configuration parameter.

Optionally, the transceiver unit is further configured to receive first network service data sent by the network node in the target network node set, where the first network service data includes a network configuration, a network topology, and network performance. The processing unit is further configured to obtain the first service scenario information based on the first network service data.

Optionally, the processing unit is further configured to determine the first network configuration parameter based on the first network energy saving mode, the first service scenario information, and a pre-stored association relationship among service scenario information, a network energy saving mode, and a network configuration parameter.

Optionally, the processing unit is further configured to obtain second service scenario information of the network node in the target network node set. The processing unit is further configured to determine a second network configuration parameter based on the first network energy saving mode and the second service scenario information, where the second network configuration parameter is for enabling the network node in the target network node set to operate in the energy saving working state. The transceiver unit is further configured to send a second network configuration instruction to the network node in the target network node set or the management unit of the network node in the target network node set, where the second network configuration instruction includes the second network configuration parameter.

Optionally, the transceiver unit is further configured to send energy saving control capability information to the first network management unit, where the energy saving control capability information includes at least one network energy saving mode supported by the second network management unit.

Optionally, the transceiver unit is further configured to send an energy saving control result to the first network management unit, where the energy saving control result is a result of performing energy saving control on the target network node set.

Optionally, the transceiver unit is further configured to send an energy saving feedback message to the first network management unit, where the energy saving feedback message includes the energy saving control result.

Optionally, the transceiver unit is further configured to receive a second energy saving control message sent by the first network management unit, where the second energy saving control message includes a second network energy saving mode, and the second network energy saving mode indicates a second requirement on the network energy saving effect of the target network node set and the network performance loss of the target network node set. The processing unit is further configured to trigger, based on the second energy saving control message, the target network node set to perform the energy saving operation, so that the network energy saving effect of the target network node set and the network performance loss of the target network node set meet the second network energy saving mode.

In another possible implementation, the network energy saving management apparatus includes a processor, a memory, and instructions that are stored in the memory and that can be run on the processor. When the instructions are run, the network energy saving management apparatus is enabled to perform the method in any one of the second aspect or the possible implementations of the second aspect.

In still another possible implementation, the network energy saving management apparatus includes at least one processor and a communication interface, configured to perform the method in any one of the second aspect or the possible implementations of the second aspect. Specifically, the at least one processor communicates with the outside through the communication interface. The at least one processor is configured to run a computer program, so that the network energy saving management apparatus performs the method in any one of the second aspect or the possible implementations of the second aspect. It may be understood that the outside may be an object other than the processor, or an object other than the network energy saving management apparatus.

In yet another possible implementation, the network energy saving management apparatus is a chip or a chip system. The communication interface may be an input/output interface, an interface circuit, an output circuit, an input circuit, a pin, a related circuit, or the like in the chip or the chip system. The processor may alternatively be embodied as a processing circuit or a logic circuit.

For technical effects achieved in any design of the fifth aspect, refer to technical effects achieved in different designs of the second aspect. Details are not described herein again.

According to a sixth aspect, a network energy saving management apparatus is provided, and is configured to perform the method in any one of the third aspect or the possible implementations of the third aspect. The network energy saving management apparatus may be a target network node in any one of the third aspect or the possible implementations of the third aspect, or a module used in the target network node, for example, a chip or a chip system. The network energy saving management apparatus includes a corresponding module, unit, or means for implementing the foregoing method. The module, unit, or means may be implemented by using hardware, software, or hardware executing corresponding software. The hardware or the software includes one or more modules or units corresponding to the foregoing function.

With reference to the sixth aspect, in a possible implementation, the network energy saving management apparatus includes a transceiver unit and a processing unit. The transceiver unit is configured to receive a first network configuration instruction from a second network management unit or a management unit of a network node, where the first network configuration instruction includes a first network configuration parameter, and the first network configuration parameter is for enabling a network node in a target network node set to operate in an energy saving working state. The processing unit is configured to execute the first network configuration instruction, so that network energy saving effect of the target network node set and a network performance loss of the target network node set meet a first network energy saving mode.

Optionally, the transceiver unit is further configured to send first network service data to the second network management unit or the management unit of the network node, where the first network service data includes a network configuration, a network topology, and network performance.

Optionally, the transceiver unit is further configured to send energy consumption and/or network performance of the network node to the second network management unit or the management unit of the network node.

In another possible implementation, the network energy saving management apparatus includes a processor, a memory, and instructions that are stored in the memory and that can be run on the processor. When the instructions are run, the network energy saving management apparatus is enabled to perform the method in any one of the third aspect or the possible implementations of the third aspect.

In a possible design, the network energy saving management apparatus includes at least one processor and a communication interface, configured to perform the method in any one of the third aspect or the possible implementations of the third aspect. Specifically, the at least one processor communicates with the outside through the communication interface. The at least one processor is configured to run a computer program, so that the network energy saving management apparatus performs the method in any one of the third aspect or the possible implementations of the third aspect. It may be understood that the outside may be an object other than the processor, or an object other than the network energy saving management apparatus.

In another possible design, the network energy saving management apparatus is a chip or a chip system. The communication interface may be an input/output interface, an interface circuit, an output circuit, an input circuit, a pin, a related circuit, or the like in the chip or the chip system. The processor may alternatively be embodied as a processing circuit or a logic circuit.

For technical effects achieved in any design of the sixth aspect, refer to technical effects achieved in different designs of the third aspect. Details are not described herein again.

With reference to any one of the foregoing aspects or the implementations of the aspects, in a possible implementation, the network energy saving scope information includes identifiers of one or more network nodes that are to perform an energy saving operation; or the network energy saving scope information includes any one or more of the following: a geographic location of a network node that is to perform an energy saving operation; a network standard of the network node that is to perform the energy saving operation; or a network service supported by the network node that is to perform the energy saving operation.

In this implementation, the second network management unit may directly determine the target network node set based on a list, where the target network node set includes a network node in the list; or when the network energy saving scope information includes any one or more of the geographic location of the network node that is to perform the energy saving operation, the network standard of the network node that is to perform the energy saving operation, or the network service supported by the network node that is to perform the energy saving operation, the any one or more pieces of information may be used as a "filtering condition" for the second network management unit to determine the target network node set.

With reference to any one of the foregoing aspects or the implementations of the aspects, in another possible implementation, the energy saving control result includes information indicating whether the network energy saving effect of the target network node set and the network performance loss of the target network node set meet the first network energy saving mode, or information indicating a difference between the network energy saving effect of the target network node set and the network performance loss of the target network node set and the first network energy saving mode.

In this implementation, whether the network energy saving effect of the target network node set and the network performance loss of the target network node set meet the first network energy saving mode includes two cases. In a first case, the network energy saving effect and the network performance loss meet the first network energy saving mode (or achieve an expectation). In a second case, the network energy saving effect and the network performance loss do not meet the first network energy saving mode (or do not achieve an expectation). Therefore, the information indicating whether the network energy saving effect of the target network node set and the network performance loss of the target network node set meet the first network energy saving mode may be one bit. When a value of the bit is "1", it indicates the foregoing first case. When a value of the bit is "0", it indicates the foregoing second case. When a value of the bit is "1", it indicates the foregoing second case. When a value of the bit is "0", it indicates the foregoing first case.

The difference between the network energy saving effect of the target network node set and the network performance loss of the target network node set and the first network energy saving mode may also include two cases. In a first case, the difference between the network energy saving effect of the target network node set and the network performance loss of the target network node set and the first network energy saving mode is greater than or equal to a preset threshold. In a second case, the difference between the network energy saving effect of the target network node set and the network performance loss of the target network node set and the first network energy saving mode is less than a preset threshold. The difference may be indicated by using one bit. When a value of the bit is "1", it indicates the foregoing first case. When a value of the bit is "0", it indicates the foregoing second case. When a value of the bit is "1", it indicates the foregoing second case. When a value of the bit is "0", it indicates the foregoing first case.

With reference to any one of the foregoing aspects or the implementations of the aspects, in still another possible implementation, the first network energy saving mode includes a value range of a network energy saving effect and a value range of a corresponding network performance loss, or a value range of a ratio of a network energy saving effect to a network performance loss.

For example, the requirement may include the value range (for example, a lower value limit) of the network energy saving effect and the value range (for example, an upper value limit) of the corresponding network performance loss, or may include a value range (for example, an upper value limit) of a ratio of a network performance loss to a corresponding network energy saving effect, or the value range (for example, a lower value limit) of the ratio of the network energy saving effect to the network performance loss.

With reference to any one of the foregoing aspects or the implementations of the aspects, in yet another possible implementation, the first network management unit is any one of the following: a network management system, a cross-domain network management unit, or a business support system; and the second network management unit is an element management system or a domain network management unit.

The network energy saving effect is an energy saving effect of the target network node set, and indicates an energy saving degree in a specific time period after energy saving control is performed on the target network node set. The network energy saving effect may be indicated by using a relative value of energy saving. The network energy saving effect may alternatively be indicated in another manner, for example, may be indicated by using an absolute value of energy saving (for example, Eo–En, namely, an amount of kilowatt-hour).

The network performance loss is a performance loss of the target network node set, and indicates a reduction degree or a deterioration degree of a performance indicator of a network service in a specific time period after energy saving control is performed on the target network node set. The network performance loss may be indicated by using a relative value of the performance loss. The network performance loss may alternatively be indicated in another manner, for example, may be indicated by using an absolute value (for example, Po–Pn) of the performance loss.

According to a seventh aspect, a network energy saving management system is provided, including the network energy saving management apparatus in any one of the fourth aspect or the implementations of the fourth aspect, the network energy saving management apparatus in any one of the fifth aspect or the implementations of the fifth aspect, and the network energy saving management apparatus in any one of the sixth aspect or the implementations of the sixth aspect.

According to an eighth aspect, a computer-readable storage medium is provided. The computer-readable storage medium stores instructions. When the instructions are run on a computer, the computer is enabled to perform the method in any one of the foregoing aspects or the implementations of the foregoing aspects.

According to a ninth aspect, a computer program product including instructions is provided. When the computer program product runs on a computer, the computer is enabled to perform the method in any one of the foregoing aspects or the implementations of the foregoing aspects.

According to a tenth aspect, a chip is provided. The chip is coupled to a memory, and performs the network energy saving management method in any one of the first aspect or the implementations of the first aspect of embodiments of this disclosure.

According to an eleventh aspect, a chip is provided. The chip is coupled to a memory, and performs the network energy saving management method in any one of the second aspect or the implementations of the second aspect of embodiments of this disclosure.

According to a twelfth aspect, a chip is provided. The chip is coupled to a memory, and performs the network energy saving management method in any one of the third aspect or the implementations of the third aspect of embodiments of this disclosure.

It should be noted that "coupling" in embodiments of this disclosure indicates a direct combination or an indirect combination of two components.

DESCRIPTION OF EMBODIMENTS

The following describes embodiments of this disclosure with reference to the accompanying drawings in embodiments of this disclosure.

Figure 1:
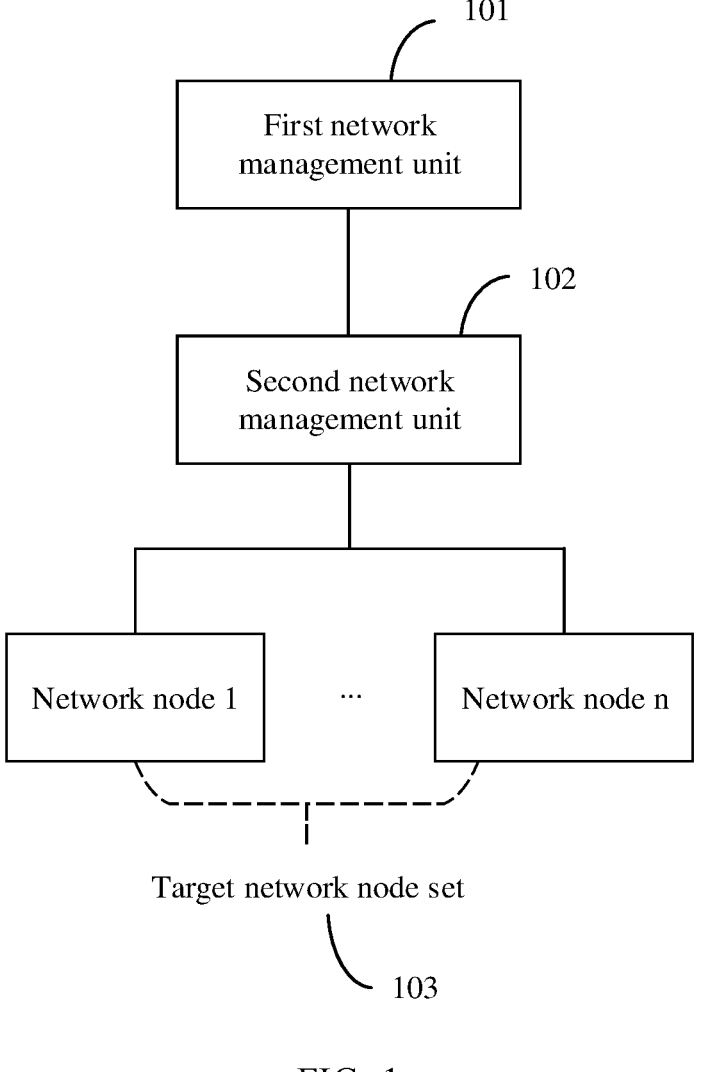
FIG. 1 is a schematic architectural diagram of a network energy saving management system according to an embodiment of this disclosure.

FIG. 1 is a schematic architectural diagram of a network energy saving management system according to an embodiment of this disclosure. The network energy saving management system includes a first network management unit 101 (where there may be more network management units that are not shown in the figure), a second network management unit 102 (where there may be more network management units that are not shown in the figure), and a network node set 103 (where as shown in the figure, the network node set 103 includes n network nodes) managed by the second network management unit 102. A function of the first network management unit 101 may be set on an independent device/apparatus, or may be set on a device/an apparatus having another function. The device/apparatus on which the function of the first network management unit 101 is set is referred to as a first network management device/first network management apparatus. For ease of description, in embodiments of this disclosure, the first network management unit, the first network management apparatus, or the first network management device is uniformly referred to as the first network management unit. Similarly, a function of the second network management unit 102 may be set on an independent device/apparatus, or may be set on a device/an apparatus having another function. The device/apparatus on which the function of the second network management unit 102 is set is referred to as a second network management device/second network management apparatus, and the second network management unit, the second network management apparatus, or the second network management device is uniformly referred to as the second network management unit. In a possible solution, the first network management unit may be a network management system (network management system, NMS), a cross-domain network management unit, or a business support system (business support system, BSS). The second network management unit may be an element management system (element management system, EMS) or a domain management unit.

A network node may be a network element or a module responsible for a network function in the network element. The network element may be a core network element, or may be a wireless network element. The core network element includes but is not limited to a mobile switching center (mobile switching center, MSC), a gateway mobile switching center (gateway mobile switching center, GMSC), a serving GPRS (general packet radio service, general packet radio service) support node (serving GPRS support node, SGSN), a gateway GPRS support node (gateway GPRS support node, GGSN), a mobility management entity (mobility management entity, MME), a serving gateway (serving gateway, SGW), a packet gateway (packet gateway, PGW), an access management function (access management function, AMF) device, a user plane function (user plane function, UPF) device, and a session management function (session management function, SMF) device. The wireless network element includes but is not limited to a base station and a base station controller. The base station may be a global system for mobile communications (global system for mobile communications, GSM) base station, a universal mobile telecommunications system (universal mobile telecommunications system, UMTS) base station, a long term evolution (long term evolution, LTE) base station, or a new radio (new radio, NR) base station. The LTE base station is also referred to as an evolved NodeB (evolved NodeB, eNB), and the new radio base station is also referred to as a 5G base station (gNodeB, gNB). The base station controller may be a GSM base station controller or a UMTS base station controller.

In the network energy saving management system, the first network management unit determines network energy saving scope information and a first network energy saving mode, and sends a first energy saving control message to the second network management unit, where the first energy saving control message includes the network energy saving scope information and the first network energy saving mode.

The network energy saving scope information is for determining a target network node set, and the set includes one or more network nodes that are to perform an energy saving operation. As shown in FIG. 1, assuming that the first network management unit 101 determines to perform energy saving control on the network node set 103, the network node set 103 is used as the target network node set. Further, the first network management unit 101 may also perform energy saving control on a part of network nodes in the network node set 103.

The first network energy saving mode indicates a first requirement on network energy saving effect of the target network node set and a network performance loss of the target network node set. For example, the requirement may include a value range (for example, a lower value limit) of a network energy saving effect and a value range (for example, an upper value limit) of a corresponding network performance loss, or may include a value range (for example, an upper value limit) of a ratio of a network performance loss to a corresponding network energy saving effect, or a value range (for example, a lower value limit) of a ratio of a network energy saving effect to a network performance loss.

The network energy saving effect is an energy saving effect of the target network node set, and indicates an energy saving degree in a specific time period after energy saving control is performed on the target network node set. The network energy saving effect may be indicated by using a relative value of energy saving. For example, assuming that the specific time period is [t1, t2], energy consumption of the target network node set in the time period [t1, t2] without energy saving control is Eo, and energy consumption of the target network node set in the time period [t1, t2] with energy saving control is En, the network energy saving effect may be indicated by $(Eo-En)/Eo*100\%$. The network energy saving effect may alternatively be indicated in another manner. For example, the network energy saving effect may be indicated by using an absolute value of energy saving (for example, Eo−En, namely, an amount of kilowatt-hour). This is not limited in embodiments of this disclosure. In the following, the relative value of energy saving indicates the network energy saving effect, and for ease of description, the network energy saving effect is sometimes referred to as an energy saving effect for short.

Energy saving control may affect performance of a network service supported by the target network node set, and may cause network performance loss.

The network performance loss is a performance loss of the target network node set, and indicates a reduction degree or a deterioration degree of a performance indicator of a network service in a specific time period after energy saving control is performed on the target network node set. The network performance loss may be indicated by using a relative value of the performance loss. For example, assuming that the specific time period is [t1, t2], a performance indicator value of the target network node set in the time period [t1, t2] without energy saving control is Po, and a performance indicator value of the target network node set in the time period [t1, t2] with energy saving control is Pn, the network performance loss may be indicated by (Po−Pn)/Po*100%. The network performance loss may alternatively be indicated in another manner. For example, the network performance loss may be indicated by using an absolute value (for example, Po−Pn) of the performance loss. This is not limited in embodiments of this disclosure. In the following, the relative value of the performance loss indicates the network performance loss, and for ease of description, the network performance loss is sometimes referred to as a performance loss for short. The performance indicator of the network service is referred to as a network performance indicator for short. The network performance indicator includes but is not limited to data traffic, a throughput, a voice traffic volume, an access success rate, a call drop rate, a handover success rate, a signal coverage rate, and the like. The network performance loss may be indicated by using any one of the foregoing plurality of network performance indicators, or may be indicated by using a combination of the plurality of network performance indicators. For example, the network performance loss is $\Delta p = f(k*\Delta TRF, m*\Delta TRP, n*\Delta BPM)$, where TRF indicates network traffic, $\Delta TRF$ indicates a network traffic loss, $\Delta TRF=(TRFo−TRFn)/TRFo*100\%$, TRFo indicates network traffic of the target network node set in the time period [t1, t2] without energy saving control, TRFn indicates network traffic of the target network node set in the time period [t1, t2] with energy saving control, TRP indicates a throughput, $\Delta TRP$ indicates a throughput loss, $\Delta TRP=(TRPo−TRPn)/TRPo*100\%$, TRPo indicates a throughput of the target network node set in the time period [t1, t2] without energy saving control, TRPn indicates a throughput of the target network node set in the time period [t1, t2] with energy saving control, BPM indicates a basic key performance indicator (key performance indicator, KPI), $\Delta BPM$ indicates a basic key performance indicator loss, $\Delta BPM=(BPMo−BPMn)/BPMo*100\%$, BPMo indicates a KPI of the target network node set in the time period [t1, t2] without energy saving control, BPMn indicates a KPI of the target network node set in the time period [t1, t2] with energy saving control, and the basic KPI includes but is not limited to indicators such as the access success rate, the call drop rate, and the handover success rate, where k, m, and n indicate weighting values of the corresponding indicators. A value range is [0, 1]. When a value is 0, it indicates that a corresponding indicator is not included. Traffic, user throughputs, and basic KPIs before and after energy saving may be obtained from a call history record/measurement report (call history record/measurement report, CHR/MR) or the like through data aggregation and collection.

The specific time period may be preset by a worker on the first network management unit and/or the second network management unit in advance, or may be determined by the first network management unit and/or the second network management unit based on an energy consumption change periodicity or a performance change periodicity.

A network energy saving mode reflects a trade-off policy or a balance policy of the first network management unit between the network energy saving effect and the network performance loss, and also reflects an intent of the first network management unit in energy saving management and control. Therefore, the network energy saving mode may also be referred to as an energy saving management and control intent, an energy saving management and control requirement, an energy saving requirement, or the like. For example, the first network management unit is an operator-level network management unit. In this case, the first network energy saving mode or the energy saving management and control intent reflects a business intent, a service intent, or a network intent of an operator.

The second network management unit triggers, based on the first energy saving control message, the target network node set to perform the energy saving operation, so that the network energy saving effect of the target network node set and the network performance loss of the target network node set meet the first network energy saving mode.

Specifically, that the second network management unit triggers, based on the first energy saving control message, the target network node set to perform the energy saving operation means that the second network management unit directly (with reference to the embodiment corresponding to FIG. 2) or indirectly (with reference to the embodiment corresponding to FIG. 3) sends a network configuration instruction to a network node in the target network node set (where for different network nodes, a same network configuration instruction may be sent, or different network configuration instructions may be sent), so that the target network node set operates in a working state in which energy can be overall saved (to support a network service), or stops operating. It should be understood that it is not necessary for each network node in the target network node set to be in the energy saving working state provided that the target network node set in general is in an energy saving state. The network configuration instruction may include a network configuration parameter. The network node in the target network node set receives and executes the network configuration instruction, so that the network node operates, stops operating, or stops operating of some functional modules based on the network configuration parameter in the network configuration instruction, to save energy.

Figure 2:
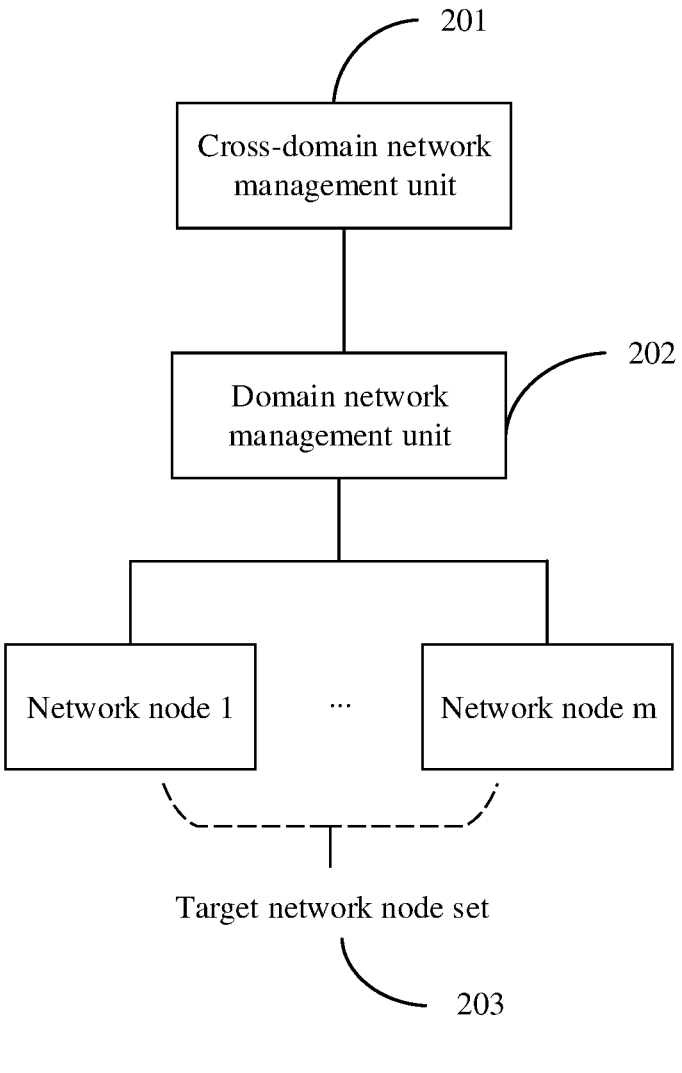
FIG. 2 is a schematic architectural diagram of another network energy saving management system according to an embodiment of this disclosure.

FIG. 2 is a schematic architectural diagram of another network energy saving management system according to an embodiment of this disclosure. A cross-domain network management unit 201 (for example, an operator-level network management unit) is the first network management unit in FIG. 1, and a domain network management unit 202 (for example, an operator subordinate unit-level network management unit) is the second network management unit in FIG. 1. The cross-domain network management unit 201 manages the domain network management unit 202 (where there may be a plurality of domain network management units, and only one domain network management unit is shown in the figure). The domain network management unit 202 manages a network node set 203 (where as shown in the figure, the network node set 203 includes m network nodes; assuming that the cross-domain network management unit 201 determines to perform energy saving control on the network node set 203, the network node set 203 is used as a target network node set). In a process of performing network energy saving management, the cross-domain network management unit 201 determines a first network energy saving mode and network energy saving scope information, and sends a first energy saving control message to the domain network management unit 202, and the domain network management unit 202 sends a network configuration instruction to a network node in the target network node set 203 based on the first energy saving control message.

Figure 3:
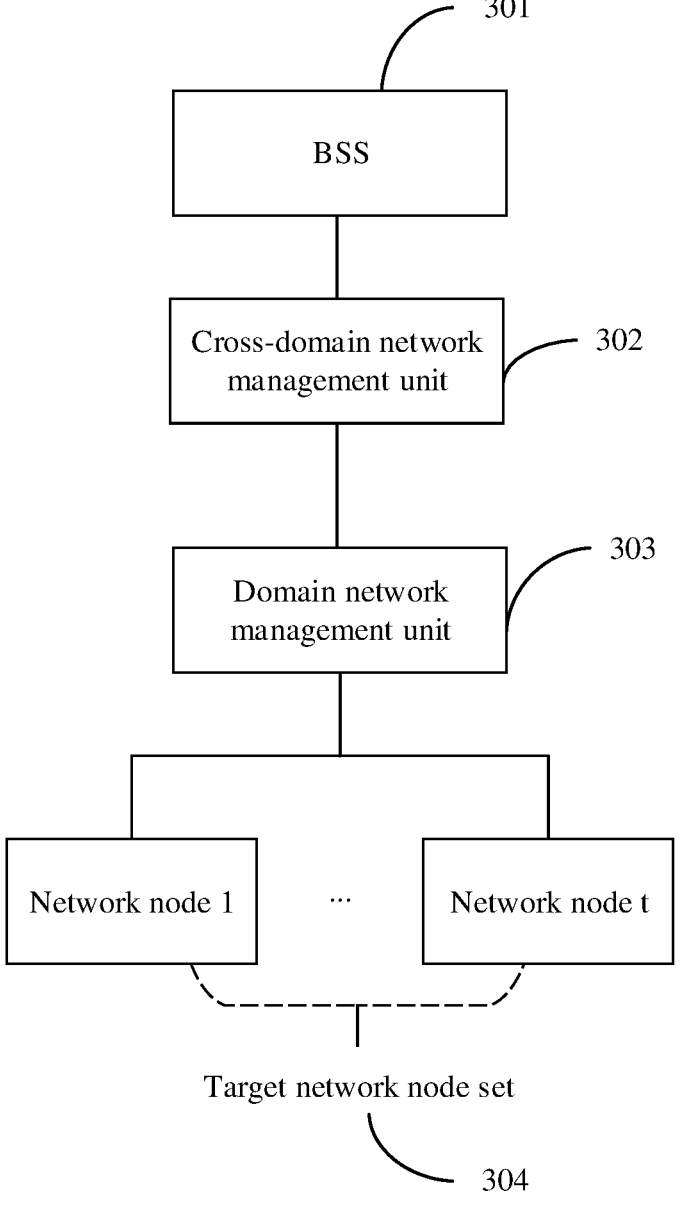
FIG. 3 is a schematic architectural diagram of still another network energy saving management system according to an embodiment of this disclosure.

FIG. 3 is a schematic architectural diagram of still another network energy saving management system according to an embodiment of this disclosure. A BSS 301 is the first network management unit in FIG. 1, and a cross-domain network management unit 302 is the second network management unit in FIG. 1. The cross-domain network management unit 302 may manage one or more domain network management units 303 (where one domain network management unit 303 is shown in the figure), and the domain network management unit 303 further manages a network node set 304 connected to the domain network management unit 303 (where as shown in the figure, the network node set 304 includes t network nodes; if the BSS 301 determines to perform energy saving control on the network node set 304, the network node set 304 is used as a target network node set). In a process of performing network energy saving management, that the BSS 301 determines a first network energy saving mode and network energy saving scope information, and sends a first energy saving control message to the cross-domain network management unit 302, and the cross-domain network management unit 302 triggers, based on the first energy saving control message, the target network node set to perform the energy saving operation includes the following several implementations.

Implementation 1: The cross-domain network management unit 302 determines a network configuration parameter based on the first energy saving control message and service scenario information of the target network node set, and sends a network configuration instruction to the target network node set 304, where the network configuration instruction includes the network configuration parameter.

Implementation 2: The cross-domain network management unit 302 determines a network configuration parameter based on the first energy saving control message and service scenario information of the target network node set, and sends a network configuration instruction to the domain network management unit 303. The domain network management unit 303 transparently transmits or forwards the network configuration instruction to the target network node set 304.

Implementation 3: The cross-domain network management unit 302 forwards the first energy saving control message to the domain network management unit 303. The domain network management unit 303 determines a network configuration parameter based on the first energy saving control message and service scenario information of the target network node set, and sends the network configuration instruction to the target network node set 304.

In the foregoing plurality of implementations, the cross-domain network management unit 302/domain network management unit 303 sends the network configuration instruction to the target network node set 304, so that the target network node set operates (to support a network service) in a working state in which energy can be overall saved, or stops operating.

The following describes a network energy saving management process in detail with reference to system architectures shown in FIG. 1 to FIG. 3.

Figure 4:
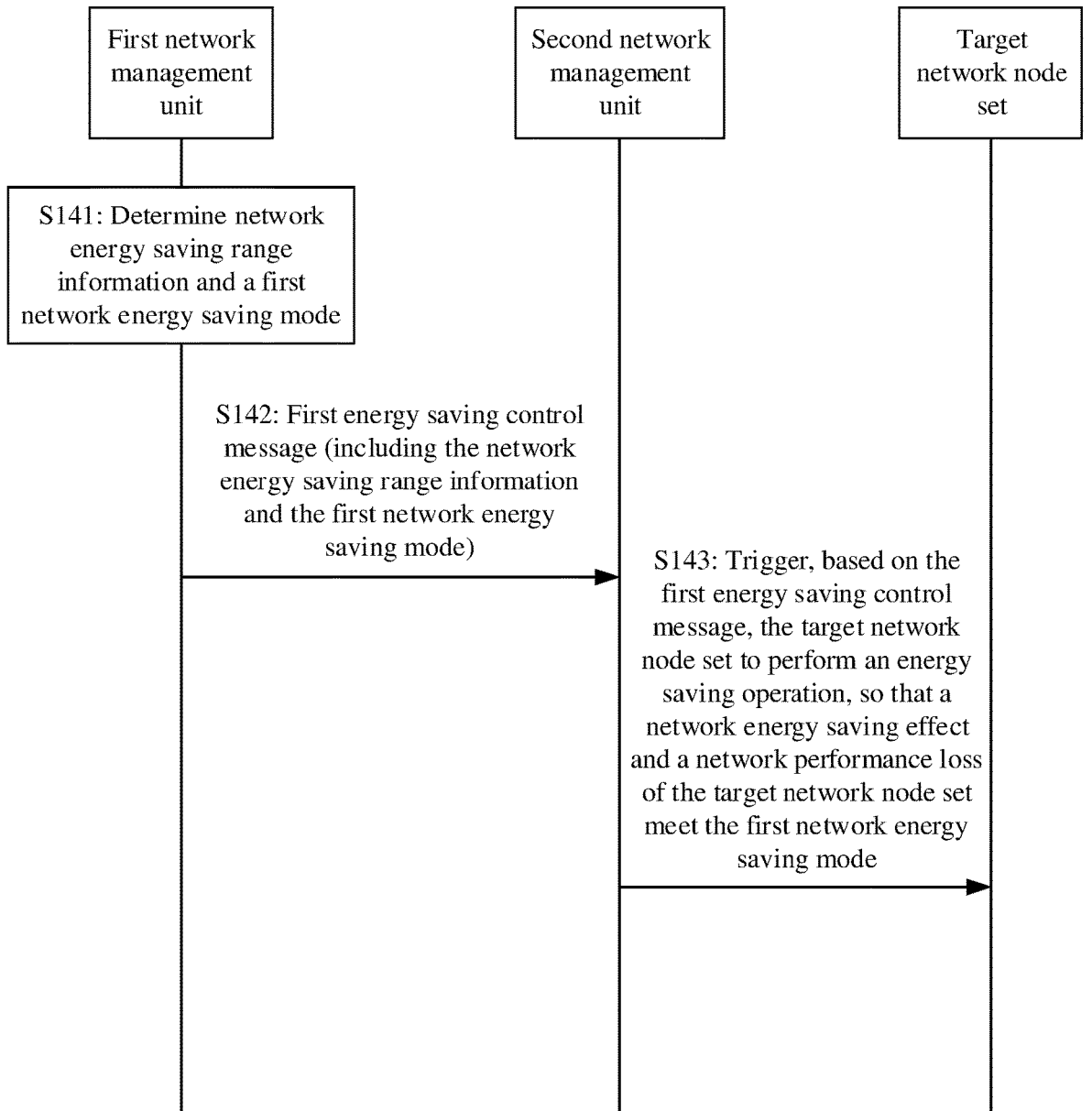
FIG. 4 is a schematic flowchart of a network energy saving management method according to an embodiment of this disclosure.

FIG. 4 is a schematic flowchart of a network energy saving management method according to an embodiment of this disclosure. The method may include the following steps.

S141: A first network management unit determines network energy saving scope information and a first network energy saving mode.

Generally, the first network management unit, for example, an operator-level network management unit, usually manages a network node set in a large area. To make network energy saving management more specific or implement "precise" energy saving, the first network management unit may perform network energy saving management on a part of network nodes managed by the first network management unit. Therefore, the first network management unit may further determine the network energy saving scope information. The network energy saving scope information may be for determining a target network node set, and the target network node set includes one or more network nodes that are to perform an energy saving operation.

In an implementation, the network energy saving scope information includes identifiers of the one or more network nodes that are to perform the energy saving operation. A second network management unit may directly determine the target network node set based on the identifiers of the one or more network nodes that are to perform the energy saving operation, where the target network node set includes the network nodes corresponding to the one or more identifiers. An identifier of a network node may be indicated by using an IP address, an IP address and a port number, a MAC address, or the like of the network node. An indication manner of the identifier of the network node is not limited in this embodiment of this disclosure.

In another implementation, the network energy saving scope information may include any one or more of the following, used as a "filtering condition" for the second network management unit to determine the target network node set:

a geographic location of a network node that is to perform an energy saving operation;

a network standard of the network node that is to perform the energy saving operation; or a network service supported by the network node that is to perform the energy saving operation.

The geographic location of the network node that is to perform the energy saving operation may be an area indicated by specific longitude and latitude bounds, or may be a pre-divided administrative region/community/street, or the like. For example, the first network management unit determines that the geographic location of the network node that is to perform the energy saving operation is a geographic area corresponding to latitude 23° to 25° and longitude 18° to 20°. In this case, it is determined that the target network node set includes a network node within the geographic area. For another example, the first network management unit determines that the geographic location of the network node that is to perform the energy saving operation is Haidian District. In this case, it is determined that the target network node set includes a network node in Haidian District.

If the network node in the target network node set is a radio access device, the network standard of the network node that is to perform the energy saving operation is a radio network standard of the target network node set participating in energy saving. For example, there are networks of three standards: GSM, LTE, and NR in current networks, and the first network management unit determines that the network standards of the target network node set are LTE and NR. In this case, it is determined that the target network node set includes a network node that uses LTE or NR.

The network service supported by the network node that is to perform the energy saving operation includes but is not limited to a mobile broadband (mobile broadband, MBB) service, a to business (to business, 2B) service (such as a meter reading service, a city surveillance video backhaul service, an industrial park intelligent manufacturing service, and an intelligent port service), an internet of vehicles (internet of vehicles, IoV) service, or the like. Therefore, a target network service herein also means a service type. The network node supporting the network service is a network node that can carry a data flow of the network service. If a wireless manager and controller are integrated or a wireless network management device also manages and controls a core network, the first network management unit may identify the network service supported by the network node. For example, the first network management unit determines that the network service supported by the network node that is to perform the energy saving operation is the meter reading service. In this case, it may be determined that the target network node set includes a network node supporting the meter reading service. Alternatively, the first network management unit is a wireless slice manager, and may identify, based on single network slice selection assistance information (single network slice selection assistance information, S-NSSAI) (also referred to as a network slice identifier), a vertical industry network service supported by the network node. Therefore, the first network management unit determines a network slice identifier, and then it may be determined that the target network node set includes a network node in a network slice identified by the network slice identifier.

A plurality of network energy saving modes are mentioned in this embodiment. The first network management unit may determine a network energy saving mode as the first network energy saving mode from the plurality of network energy saving modes.

For example, the network energy saving modes may be classified into the following types:

(1) Non-energy saving mode: The mode indicates that the target network node set is not required to operate in an energy saving working state (where certainly, no network performance loss may be caused). Specifically, a network energy saving effect X=0%, and a network performance loss Y=0%.

(2) Performance-lossless network energy saving mode: The mode indicates that the target network node set is required to operate in the energy saving working state, but no network performance loss is allowed.

(3) Performance-lossy network energy saving mode: The mode indicates that the target network node set is required to operate in the energy saving working state, and a specific network performance loss is allowed. Specifically, the performance-lossy network energy saving mode may further have the following forms:

(3.1) Performance loss limit mode: The mode indicates that the target network node set is required to operate in the energy saving working state, but it is ensured that the network performance loss is not greater than a threshold b %, and the network energy saving effect is not limited. There are a performance-slightly lossy mode, a performance-moderately lossy mode, a performance-heavily lossy mode, and the like based on a value of b %.

(3.2) Cost performance limit mode: The mode indicates that the target network node set is required to operate in the energy saving working state, but it is ensured that a ratio of the network energy saving effect to the network performance loss is not lower than a threshold p.

(4) Full network energy saving mode: The mode indicates that the target network node set is required to be shut down or stop operating, and no energy consumption is generated.

The first network management unit may determine a network energy saving mode as the first network energy saving mode from the plurality of network energy saving modes in the foregoing example. For example, the first network management unit may determine the first network energy saving mode based on an attribute of a network service or locally preset configuration data. The attribute of the network service includes a priority, a service type, and the like. For example, the first network management unit may determine the first network energy saving mode based on a priority of the network service, select the non-energy saving mode for a target network node set corresponding to a high-priority network service, select the performance-slightly lossy mode for a target network node set corresponding to a moderate-priority network service, and select the performance-heavily lossy mode for a target network node set corresponding to a low-priority network service. For another example, the first network management unit may alternatively determine the first network energy saving mode based on a type of the network service, select the performance-heavily lossy mode for a target network node set corresponding to a meter reading service, select the performance-slightly lossy mode for a target network node set corresponding to a city surveillance video backhaul service, and select the non-energy saving mode for a target network node set corresponding to an ultra-reliable and low-latency communication (ultra-reliable and low-latency communication, URLLC) service. Alternatively, the first network management unit may locally preconfigure a correspondence between a network service and a network energy saving mode. For example, the first network management unit configures the meter reading service to correspond to the performance-heavily lossy mode, configures the city surveillance video backhaul service to correspond to the performance-slightly lossy mode, and configures the URLLC service to correspond to the non-energy saving mode. In this case, before performing network energy saving management, the first network management unit may identify a current network service of a target network node set in a network energy saving scope, and then determine, based on the locally preset configuration data, a network energy saving mode corresponding to the network service.

S142: The first network management unit sends a first energy saving control message to the second network management unit. Correspondingly, the second network management unit receives the first energy saving control message.

After determining the first network energy saving mode and the network energy saving scope information, the first network management unit generates the first energy saving control message, where the first energy saving control message includes the network energy saving scope information and the first network energy saving mode.

The first network management unit delivers the first energy saving control message to the second network management unit, so that the second network management unit may trigger, based on the first energy saving control message, the target network node set to perform the energy saving operation, and network energy saving effect of the target network node set and a network performance loss of the target network node set meet the first network energy saving mode. For example, the first network management unit is an operator-level network management unit. In this case, the first network management unit sends the first energy saving control message, to meet a business intent, a service intent, or a network intent of an operator.

In a possible implementation, a network energy saving mode in an energy saving control message may explicitly include a requirement of the first network management unit for the network energy saving effect and the network performance loss of the target network node set. The following provides an example of the energy saving control message and the network energy saving mode included in the energy saving control message.

```
EnergySaveControlRequest{
    "EnergySaveMode" {//Non-energy saving mode
        "EnergySaved":"0"//Indicates that energy saving is not required
(where certainly, no corresponding performance loss may be caused)
    }
}
EnergySaveControlRequest{
    "EnergySaveMode" {//Performance-lossless energy saving mode
        "PerformanceLost":"0"//Indicates that lossless network
        performance is required
        "EnergySaved":"any"//Indicates that an energy saving effect is
        not limited
    }
}
EnergySaveControlRequest{
    "EnergySaveMode" {//Performance-lossy energy saving mode
(performance loss limit mode)
        "PerformanceLost":"<5%"//Indicates that a network
performance loss is required to be less than 5%
        "EnergySaved":"any"//Indicates that the energy saving effect is
        not limited
    }
}
Energy SaveControlRequest{
    "EnergySaveMode" {//Performance-lossy energy saving mode
(cost performance limit mode)
        "PerformanceLost":"any"//Indicates that the network energy
saving effect is not limited
        "EnergySaved":"any"//Indicates that the network energy saving
effect is not limited
        "Energy SavedPerformanceLostRatio":">1"//Indicates that a
ratio of the network energy saving effect to the network performance
loss is required to be greater than 1
    }
}
```

Optionally, the foregoing EnergySaveMode may further include a time period, indicating that an energy saving effect and a performance loss are calculated in the time period. An example is as follows:

```
EnergySaveControlRequest{
    "Energy SaveMode" {//Performance-lossy energy saving mode
(performance loss limit mode)
        "PerformanceLost":"<10%"//Indicates that a network
performance loss is required to be less than 10%
        "EnergySaved":"any"//Indicates that a network energy saving
effect is not limited
        "TimeRange":"720min"//Indicates that the network performance
loss is statistical data within 12 hours after energy saving control is
performed
    }
}
```

In a possible implementation, some network energy saving modes may be preset in the first network management unit, the second network management unit, and a network management unit of the target network node set, and unique identifiers may be set for these network energy saving modes. In this case, the energy saving control message may include a unique identifier of the network energy saving mode. An example of the energy saving control message is as follows:

```
EnergySaveControlRequest{
    "EnergySaveModeId":"ASDF1234"//Network energy saving mode
    identifier
}
```

It should be understood that, in a possible solution, the first energy saving control message may not include the network energy saving scope information. This indicates that the first network management unit indicates to perform energy saving control on all network nodes in a management scope of the first network management unit. For example, the first network management unit is an NMS, and the second network management unit is an element management system (element management system, EMS). The NMS manages one or more EMSs, and each EMS manages a network device (network device) in a small scope. In this case, the NMS may not determine the network energy saving scope information, but perform energy saving control on all network devices managed by the NMS.

It should be understood that, in a possible solution, the first network management unit may alternatively receive the first energy saving control message from another first network management unit, instead of generating the first energy saving control message by the first network management unit.

S143: The second network management unit triggers, based on the first energy saving control message, the target network node set to perform the energy saving operation, so that the network energy saving effect of the target network node set and the network performance loss of the target network node set meet the first network energy saving mode.

After receiving the first energy saving control message sent by the first network management unit, the second network management unit determines the target network node set based on the network energy saving scope information in the first energy saving control message.

Specifically, the second network management unit may determine the target network node set based on the foregoing one or more items in the network energy saving scope information.

For example, assuming that the network energy saving scope information includes identifiers of network nodes 1 to m, the network nodes 1 to m are determined as members of the target network node set.

For another example, assuming that the geographic location, included in the network energy saving scope information, of the network node that is to perform the energy saving operation is "latitude 23° to 25° and longitude 18° to 20°", a network node located in a geographic area of latitude 23° and longitude 18° is determined as a member of the target network node set.

For another example, assuming that the geographic location, included in the network energy saving scope information, of the network node that is to perform the energy saving operation is "Haidian District", a network node in Haidian District is determined as a member of the target network node set.

For another example, assuming that the network standard, included in the network energy saving scope information, of the network node that is to perform the energy saving operation includes LTE and NR, a network node whose network standard is LTE or NR is determined as a member of the target network node set.

For another example, assuming that the network service, included in the network energy saving scope information, supported by the network node that is to perform the energy saving operation is a "meter reading service", a network node supporting the meter reading service is determined as a member of the target network node set.

For another example, assuming that a slice identifier, included in the network energy saving scope information, of the network service supported by the network node that is to perform the energy saving operation is "S-NSSAI123", a network node whose S-NSSAI is "S-NSSAI123" is determined as a member of the target network node set.

For another example, assuming that the geographic location, included in the network energy saving scope information, of the network node that is to perform the energy saving operation is "Haidian District", and the network standard, included in the network energy saving scope information, of the network node that is to perform the energy saving operation is "NR", a network node whose network standard is "NR" in Haidian District is determined as a member of the target network node set.

It should be understood that the target network node set is a network node that can be managed by the second network management unit, that is, a network node to which a network configuration instruction may be directly or indirectly sent. That a network configuration instruction is indirectly sent to the network node means that the second network management unit sends the network configuration instruction to the network node through another device. For example, the network configuration instruction is sent to a management unit of the network node, and then the management unit of the network node sends the network configuration instruction to the network node.

That the second network management unit triggers, based on the first energy saving control message, the target network node set to perform the energy saving operation may be understood as that the second network management unit triggers, based on the first energy saving control message, the target network node set to perform the energy saving operation, or the second network management unit indicates, based on the first energy saving control message, the target network node set to perform the energy saving operation. Specifically, after determining the target network node set, the second network management unit parses the requirement, indicated by the first network energy saving mode, for the network energy saving effect of the target network node set and the network performance loss of the target network node set, and triggers, based on the requirement, the target network node set to perform the energy saving operation, so that the network energy saving effect of the target network node set and the network performance loss of the target network node set meet the first network energy saving mode. The energy saving operation means that the network node in the target network node set operates in the energy saving working state, or even stops operating.

According to the network energy saving management method provided in this embodiment of this disclosure, the first network management unit delivers the first energy saving control message, and the second network management unit triggers, based on the first energy saving control message, the target network node set to perform the energy saving operation. Therefore, the network energy saving effect and the network performance loss can continuously meet a specified requirement, and a telecommunications operator can balance a relationship between the network energy saving effect and the network performance loss in general.

Service scenario information of the network node may change. If the second network management unit delivers a fixed network configuration instruction (including a network configuration parameter) to the target network node set based on the first network energy saving mode, the network energy saving effect of the target network node set and the network performance loss of the target network node set may not meet the first network energy saving mode finally. For example, in a specific time period, a service scenario of a base station is low network load and a small quantity of users. In this case, the second network management unit may include a large quantity of energy saving switch parameters (for example, a symbol shutdown switch and a carrier shutdown switch) in the network configuration instruction that is sent, and a value of each energy saving switch parameter may also be large (for example, a shutdown time period may be long, and a load threshold for triggering carrier shutdown may be high). In another time period, a service scenario of the base station changes to a great increase in a quantity of users and load. If the base station still enables carrier shutdown, some user equipment cannot perform access or throughputs of some user equipment's decrease, causing a network service performance loss. Consequently, the network energy saving mode (which is assumed to be a "lossless energy saving mode") previously delivered by the first network management unit cannot be met.

In addition, sometimes the target network node set may not meet the network energy saving mode determined by the first network management unit, and the first network management unit delivers a fixed network energy saving mode to the second network management unit. Finally, an overall energy saving requirement of the operator may not be met.

Therefore, this disclosure provides another network energy saving management method. After receiving a first energy saving control message sent by a first network management unit, a second network management unit may deliver different network configuration parameters based on a first network energy saving mode and different service scenarios of a network node. The first network management unit may further adjust, based on an energy saving control result fed back by the second network management unit, a network energy saving mode delivered to the second network management unit, so that a network energy saving effect and a network performance loss of a target network node set meet the delivered network energy saving mode as much as possible.

Figure 5A:
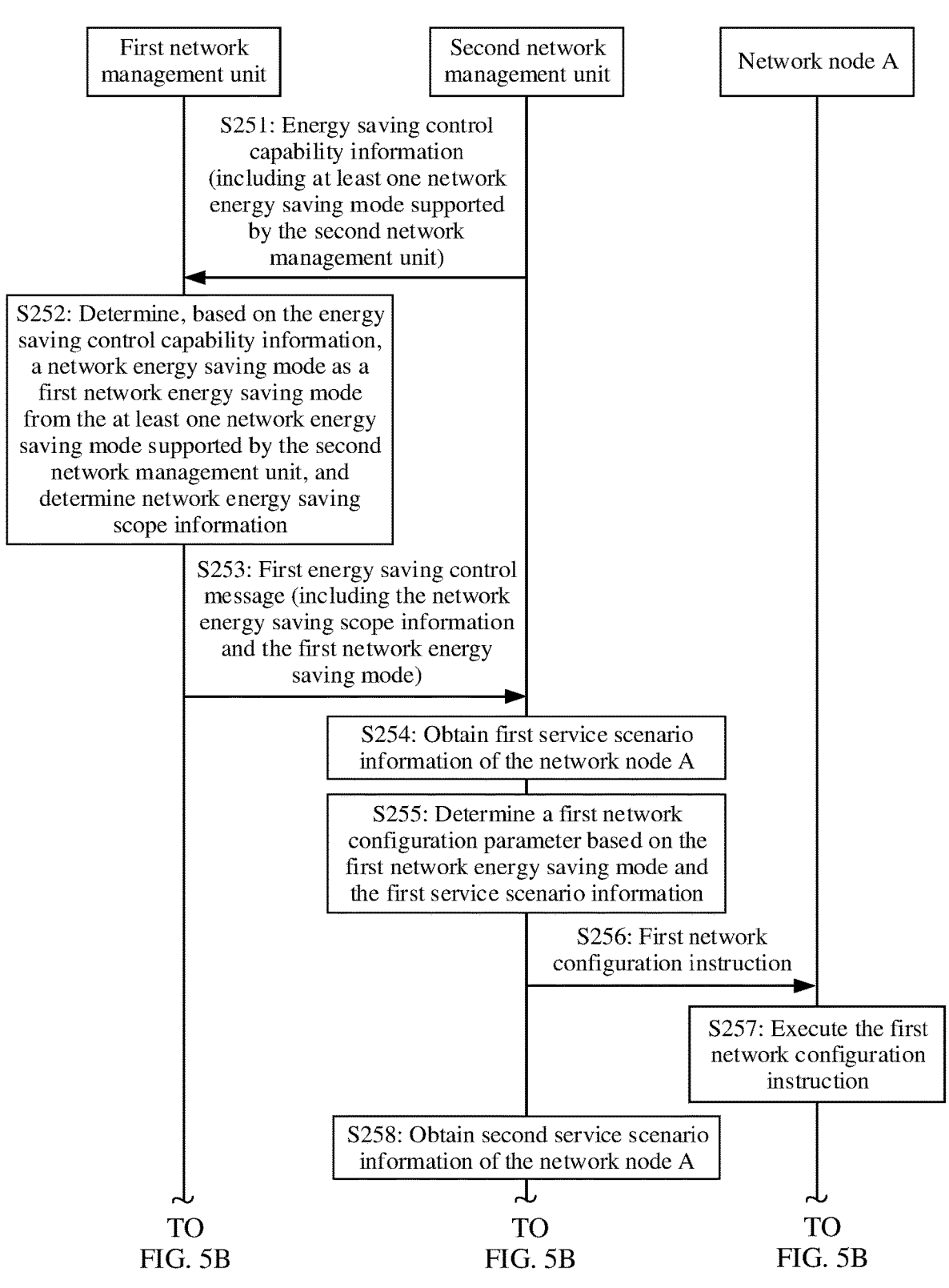
FIG. 5A and FIG. 5B are a schematic flowchart of another network energy saving management method according to an embodiment of this disclosure.
Figure 5B:
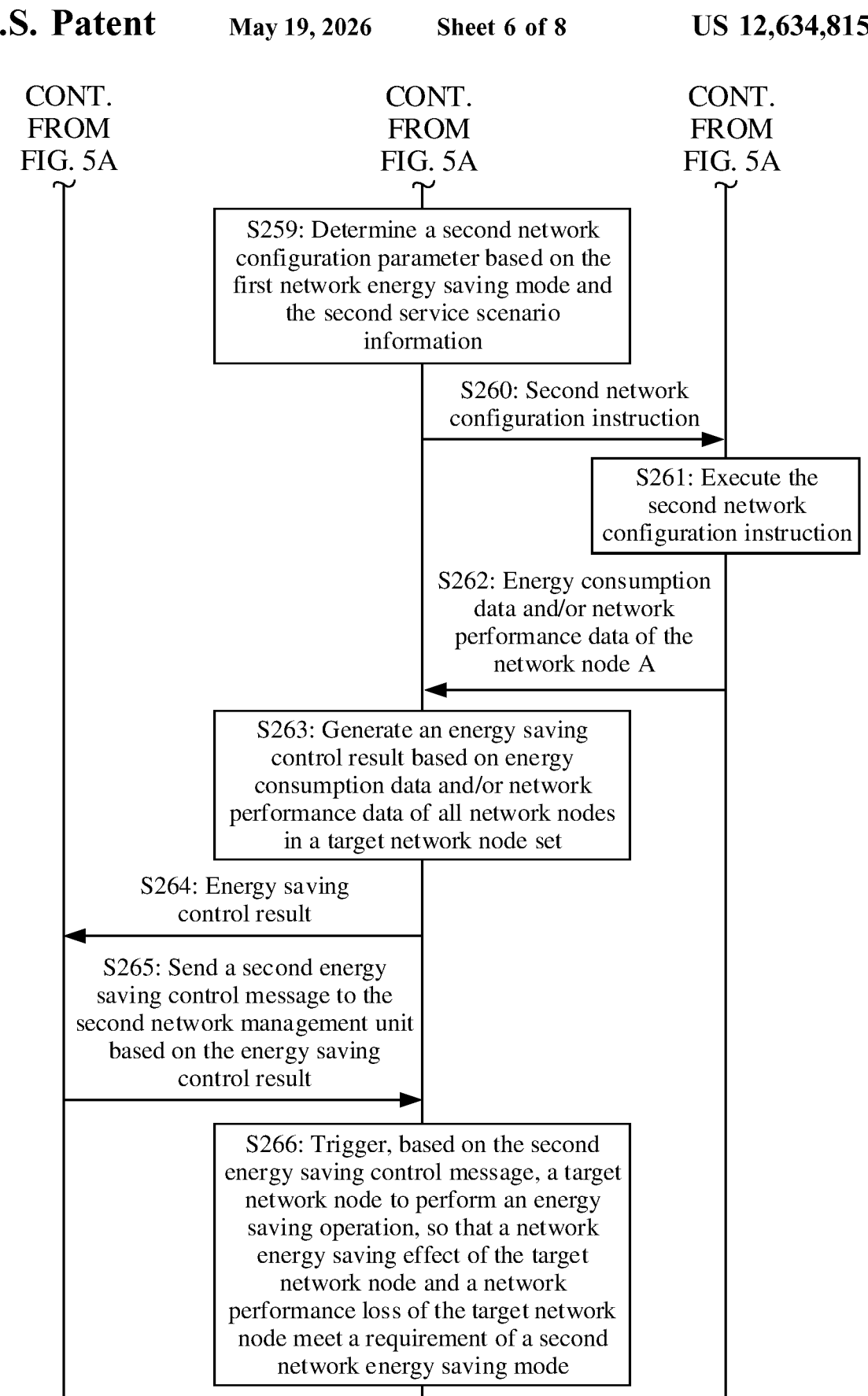

FIG. 5A and FIG. 5B are a schematic flowchart of another network energy saving management method according to an embodiment of this disclosure. The method may include the following steps.

S251: A second network management unit sends energy saving control capability information to a first network management unit, where the energy saving control capability information includes at least one network energy saving mode supported by the second network management unit. Correspondingly, the first network management unit receives the energy saving control capability information.

The first network management unit may determine any one of the network energy saving modes described in the foregoing embodiment. However, the second network management unit may not support all the network energy saving modes due to factors such as a network topology and a network configuration of the second network management unit. Therefore, the second network management unit sends the energy saving control capability information to the first network management unit. The energy saving control capability information includes the at least one network energy saving mode supported by the second network management unit. Correspondingly, the first network management unit receives the energy saving control capability information.

S252: The first network management unit selects, based on the energy saving control capability information, a network energy saving mode as a first network energy saving mode from the at least one network energy saving mode supported by the second network management unit, and the first network management unit further determines network energy saving scope information.

After receiving the at least one network energy saving mode that is supported by the second network management unit and that is reported by the second network management unit, the first network management unit may select the network energy saving mode as the first network energy saving mode from the at least one energy saving mode supported by the second network management unit. For example, the second network management unit reports that the second network management unit supports a performance-lossless network energy saving mode and a performance-lossy network energy saving mode, and a network energy saving mode expected by the first network management unit is the performance-lossy network energy saving mode. In this case, the first network management unit may determine the performance-lossy network energy saving mode, and the network energy saving mode is also the network energy saving mode supported by the second network management unit.

Further, the first network management unit further determines the network energy saving scope information. For a manner of determining the network energy saving scope information by the first network management unit, refer to the related descriptions of step S141 in the embodiment shown in FIG. 4.

It may be understood that the first network management unit may alternatively determine the network energy saving mode based on locally preset configuration data. Therefore, the first network management unit may not perform the foregoing steps S251 or S252.

S253: The first network management unit sends a first energy saving control message to the second network management unit. Correspondingly, the second network management unit receives the first energy saving control message.

For a specific implementation of this step, refer to step S142 in the embodiment shown in FIG. 4.

Then, to enable an overall network energy saving effect and/or an overall network performance loss of a target network node set to meet the first network energy saving mode, the second network management unit performs energy saving control on each network node in the target network node set, which includes: determining, based on service scenario information and the first network energy saving mode, whether to send a network configuration instruction to the network node, and if the network configuration instruction is sent, further determining a to-be-sent network configuration parameter.

Any network node (for example, a network node A) in the target network node set is used as an example, and an example process in which the second network management unit performs energy saving control on the network node is a process of S254 to S257 or S254 to S261.

S254: The second network management unit obtains first service scenario information of the network node A.

Service scenario information of the network node A is associated with network service data of the network node A, and the second network management unit may obtain service scenario information of the network node based on network service data of the network node.

Specifically, the network node A sends first network service data to the second network management unit or a management unit of the network node A. Correspondingly, the second network management unit receives the first network service data of the network node A.

In an implementation, the second network management unit may periodically indicate the network node A to report the network service data of the network node A, or periodically indicate the management unit of the network node A to report the network service data of the network node A managed by the management unit of the network node A. The second network management unit may send a subscription request message to the network node A, to indicate the network node A to report the network service data. A reporting periodicity may be preset in the network node A, or may be specified by the second network management unit by using the subscription request message. In another implementation, when detecting that the network service data of the network node A changes, the network node A may actively send the network service data of the network node A to the management unit of the network node A or the second network management unit.

The first network service data includes but is not limited to the following data:

(1) network configuration data, including a network standard of the network node, a neighboring cell relationship of the network node, a network configuration parameter, a frequency, bandwidth, and the like;

(2) network topology data, including a network connection relationship and engineering parameter information (including a network node location, an antenna mechanical azimuth/tilt, and the like), where the second network management unit may collect the engineering parameter information from the target network node set, or may import the engineering parameter information externally in advance; and (3) network performance data, including energy consumption, load, traffic, a throughput, an access success rate, a call drop rate, a handover success rate, a coverage rate, and the like.

After receiving the first network service data from the network node A or the management unit of the network node A, the second network management unit obtains the first service scenario information based on the first network service data. Specifically, the second network management unit first preprocesses the first network service data, including performing parsing, association, abnormal data removal, and the like on the network configuration data, the network topology data, and the network performance data. Then, the second network management unit extracts, from the preprocessed first network service data, a network scenario feature, including but not limited to a network standard, a traffic feature, and the like, related to an energy saving operation. Then, the first service scenario information of the network node is identified based on the extracted network scenario feature of the first network service data. For example, the identified first service scenario information may be a "GSM single-RAT high-traffic load scenario" or a "GSM/LTE multi-RAT multi-frequency multimode low-traffic load scenario".

The second network management unit may determine, based on the obtained first service scenario information, not to send, to the network node A, a network configuration instruction for enabling the network node A to perform an energy saving operation. For example, the second network management unit determines, based on the first service scenario information, that a traffic volume of the network node A is heavy (for example, exceeds a preset threshold) in this case. If further energy saving excessively damages network performance, the second network management unit determines not to send the network configuration instruction for enabling the network node A to perform the energy saving operation, and does not perform S255 or subsequent steps. It is assumed in the following that the second network management unit determines to send the network configuration instruction to the network node A.

S255: The second network management unit determines a first network configuration parameter based on the first network energy saving mode and the first service scenario information, where the first network configuration parameter is for enabling the network node A to operate in an energy saving working state.

In this embodiment, there is an association relationship among the network energy saving mode, the service scenario information, and the network configuration parameter. The association relationship may be a function relationship, a table relationship, a line graph relationship, or the like. The association relationship may be obtained through training of a neural network model.

It may be understood that there are a plurality of network energy saving modes, the service scenario information also includes multi-dimensional information, and there are also a plurality of network configuration parameters. The association relationship is a relationship among the plurality of network energy saving modes, the multi-dimensional service scenario information, and the plurality of network configuration parameters. Different network energy saving modes or different service scenario information may be associated with a same network configuration parameter, a same network energy saving mode or same service scenario information may also be associated with different network configuration parameters, and a same network energy saving mode may be associated with different service scenario information.

The second network management unit may determine the network configuration parameter based on the network energy saving mode and the service scenario information. Specifically, in this embodiment, the second network management unit may determine the first network configuration parameter based on the first network energy saving mode and the first service scenario information of the target network node set.

The network configuration parameter includes an energy saving switch parameter, a shutdown time period, a shutdown threshold, and the like.

The energy saving switch parameter may further include:
(a1) a symbol shutdown switch, where when the switch is turned on, it indicates that the network node shuts down a power amplifier during a symbol periodicity when there is no data to send, to reduce system power consumption;
(a2) a radio frequency channel shutdown switch, where when the switch is turned on, it indicates that some radio frequency channels are shut down within a preset time period under a load condition, to reduce system power consumption;
(a3) a carrier shutdown switch, where when a network is idle and there are few services, one or more carriers within a same coverage area are shut down, to reduce power consumption of the network node; and (a4) a transmit power of the network node, where the transmit power of the network node is reduced to reduce system power consumption.

The shutdown time period may further include:
(b1) a start time point and an end time point of radio frequency channel shutdown: indicating the start time point and the end time point of radio frequency channel shutdown; and
(b2) a start time point and an end time point of carrier shutdown: indicating the start time point and the end time point of carrier shutdown.

The shutdown threshold may further include:
(c1) an uplink PRB usage threshold and a downlink PRB usage threshold of radio frequency channel shutdown: indicating that when uplink or downlink PRB usage of the network node is lower than the threshold, the radio frequency channel shutdown is triggered, that is, some radio frequency channels are shut down;
(c2) a user quantity threshold of radio frequency channel shutdown: indicating that when a quantity of users served by the network node is lower than the threshold, the radio frequency channel shutdown is triggered, that is, some radio frequency channels are shut down;
(c3) an uplink PRB usage threshold and a downlink PRB usage threshold of carrier shutdown: indicating that when uplink or downlink PRB usage of a carrier is lower than the threshold, the carrier shutdown is triggered, that is, the carrier is shut down; and (c4) a user quantity threshold of carrier shutdown: indicating that when a quantity of users served by the carrier is lower than the threshold, the carrier shutdown is triggered, that is, the carrier is shut down.

The following describes examples of the association relationship between the service scenario information and the network configuration parameter, and the association relationship between the network energy saving mode and the network configuration parameter.

Relationship Between Service Scenario Information and Network Configuration Parameter (a) The second network management unit determines the network configuration parameter (for example, determines whether to reduce a transmit power of a base station and whether to enable symbol shutdown, radio frequency channel shutdown, or carrier shutdown, and sets a corresponding shutdown start time point, end time point, uplink PRB usage threshold, downlink PRB usage threshold, user quantity threshold, and the like) based on the service scenario information (for example, traffic load) of the network node. A cell or a time period with a low traffic volume indicates a low traffic volume or a small quantity of users (for example, an average quantity of users is less than 1). In this case, the symbol shutdown, the radio frequency channel shutdown, and the carrier shutdown may all be enabled. Correspondingly, a longer shutdown time period may be set (where specifically, the shutdown time period is related to a time period with a low traffic volume or a small quantity of users), and a higher shutdown threshold may be set (for example, a PRB usage threshold may be set to 25% to 35%, which is merely an example; or the PRB usage threshold may be set to a larger or lower value). In this way, the network energy saving effect is good. In a heavy traffic load service scenario, a part of the symbol shutdown, the radio frequency channel shutdown, and the carrier shutdown may be enabled, a shorter shutdown time period may be set, and a lower shutdown threshold may be set, for example, only the symbol shutdown is enabled. Consequently, the network energy saving effect is poor.

(b) The second network management unit determines the network configuration parameter (for example, determines whether to migrate traffic or a user to a network standard or a frequency, to reduce or even clear traffic of another network standard or frequency, and increases a shutdown threshold and duration of a shutdown time period of radio frequency channel shutdown or carrier shutdown of a low-traffic or no-traffic carrier) based on the service scenario information (for example, a wireless network standard and a quantity of frequencies of each standard) of the network node, to achieve a higher expected network energy saving effect.

Relationship Between Network Energy Saving Mode and Network Configuration Parameter The second network management unit determines the network configuration parameter based on the network energy saving mode, for example, determines whether to reduce a transmit power of a base station and whether to enable the symbol shutdown, the radio frequency channel shutdown, or the carrier shutdown, and sets a corresponding shutdown start time point, end time point, uplink PRB usage threshold, downlink PRB usage threshold, user quantity threshold, and the like. For same service scenario information, if a network performance loss allowed by the network energy saving mode is higher, more energy saving switch parameters may be used. Correspondingly, a longer shutdown time period may be set, and a higher shutdown threshold may be set. In this way, the network energy saving effect is better. If a network performance loss allowed by the network energy saving mode is lower, fewer energy saving switch parameters may be used. Correspondingly, a shorter shutdown time period may be set, and a lower shutdown threshold may be set. In this way, the network energy saving effect is poor.

For example, in an LTE multi-carrier heavy-traffic load scenario, (a) when a performance-lossless network energy saving mode is determined, only the symbol shutdown is enabled, and the network energy saving effect may reach only 3% to 5% (which is merely an example of data, where the network energy saving effect may reach a lower or higher value); or (b) when a performance-moderately lossy mode is determined, the symbol shutdown, the radio frequency channel shutdown, and the carrier shutdown may all be enabled, a PRB usage threshold may be set to 10% to 20% (which is merely an example, where the threshold may be higher or lower), a user quantity threshold may be set to 2 to 3 (which is merely an example, where the threshold may be higher or lower), and 12 hours with a lowest traffic volume in a day may be selected as a corresponding shutdown time period (which is merely an example, where the shutdown time period may be higher or lower); the network energy saving effect may reach 8% to 10% (which is merely an example, where the network energy saving effect may reach a higher or lower value), but the network performance loss may also reach 10% to 20% (which is merely an example, where the network performance loss may reach a higher or lower value).

It can be learned that there is an association relationship between the service scenario information and the network configuration parameter, and between the network energy saving mode and the network configuration parameter, so that the association relationship among the service scenario information, the network energy saving mode, and the network configuration parameter may be obtained through training of the neural network model or the like.

The second network management unit may pre-store the association relationship among the service scenario information, the network energy saving mode, and the network configuration parameter. The pre-stored association relationship among the service scenario information, the network energy saving mode, and the network configuration parameter may be obtained in the following manners.

(1) The foregoing association relationship model is preset in the second network management unit: In an offline manner, after the second network management unit or an offline platform with a model processing function performs multi-dimensional mathematical fitting or regression on a large amount of existing data to obtain the association relationship model, development personnel preset the association relationship model in an online second network management unit through version upgrade. Input data required for offline fitting or regression includes but is not limited to network element scenario data, network configuration data, network topology data, network performance data, and the like.

(2) The second network management unit obtains the association relationship in an online learning manner: A relationship among a performance loss, an energy saving effect, and a network configuration parameter (that is, a network configuration parameter value combination) in different scenarios is obtained in a manner of gradually increasing energy saving intensity.

The second network management unit may determine the first network configuration parameter based on the received first network energy saving mode, the first service scenario information, and the pre-stored association relationship among the service scenario information, the network energy saving mode, and the network configuration parameter. Specifically, the received first network energy saving mode and the first service scenario information may be input into the neural network model to output the first network configuration parameter.

One target network node set may include one or more network nodes, and service scenario information of different network nodes may be different. An example in which the service scenario information is a traffic load feature is used. In one target network node set, traffic load of a network node is very high, for example, traffic load of a base station is higher than a first value, and the base station is considered as a heavily loaded base station; traffic load of a network node is high, for example, traffic load of a base station is lower than the first value and higher than a second value, and the base station is considered as a moderately loaded base station; traffic load of a network node is low, for example, traffic load of a base station is lower than the second value, and the base station is considered as a lightly loaded base station. Different network configuration parameters may be configured for network nodes corresponding to different service scenario information in one target network node set. For example, for the heavily loaded base station, to increase a transmit power of the base station, the transmit power of the base station is configured as A1; for the moderately loaded base station, a transmit power of the base station may be kept unchanged, for example, the current transmit power of the base station is A2; for the lightly loaded base station, to reduce a transmit power of the base station, the transmit power of the base station is configured as A3. An increase in the transmit power of the base station definitely may cause an increase in energy consumption of the base station. A decrease in the transmit power of the base station may cause a decrease in the energy consumption of the base station. However, energy saving management is performed in this embodiment provided that an overall network energy saving effect and an overall network performance loss of the target network node set meet the network energy saving mode. Therefore, different network configuration parameters may be determined for different service scenario information of the network nodes in the target network node set.

S256: The second network management unit sends a first network configuration instruction to the network node A or the management unit of the network node A, where the first network configuration instruction includes the first network configuration parameter. Correspondingly, the network node or the management unit of the network node receives the first network configuration instruction.

After determining the first network configuration parameter, the second network management unit sends the first network configuration instruction to the network node A or the management unit of the network node A, where the first network configuration instruction includes the first network configuration parameter, and the first network configuration instruction indicates the network node to execute the first network configuration parameter.

In an implementation, the second network management unit may separately send the first network configuration instruction to each network node in the target network node set or a management unit of each network node.

In another implementation, the second network management unit may alternatively uniformly send the first network configuration instruction to all network nodes in the target network node set or management units of all the network nodes. In the foregoing implementation, first network configuration parameters corresponding to all the network nodes may be the same or different, or first network configuration parameters corresponding to some network nodes are the same.

It may be understood that, in an alternative manner of steps S254 to S256, for example, in the system architecture shown in FIG. 3, after receiving the first energy saving control message, the second network management unit (the cross-domain network management unit 302) may forward the first energy saving control message to the domain network management unit 303. The domain network management unit 303 determines the first network configuration parameter based on the first energy saving control message and the service scenario information of the network node in the target network node set 304, and sends, to the network node in the target network node set 304, the first network configuration instruction carrying the first network configuration parameter.

It may be understood that, in another alternative manner of steps S254 to S256, for example, in the system architecture shown in FIG. 3, after receiving the first energy saving control message, the second network management unit (the cross-domain network management unit 302) determines the first network configuration parameter, and sends, to the domain network management unit 303, the first network configuration instruction carrying the first network configuration parameter. The domain network management unit 303 transparently transmits or forwards the first network configuration instruction to the network node in the target network node set 304.

S257: The network node A executes the first network configuration instruction.

After receiving the first network configuration instruction sent by the second network management unit or the management unit of the network node A, the network node A in the target network node set executes the first network configuration instruction. For example, if the first network configuration instruction is to adjust an energy saving switch parameter of the network node A in the target network node set, the network node A in the target network node set adjusts the energy saving switch parameter of the network node A to an energy saving switch parameter carried in the first network configuration instruction. For another example, if the first network configuration instruction is to adjust a shutdown time period and a shutdown threshold, the network node A in the target network node set adjusts the shutdown time period of the network node A based on a shutdown time period required by the first network configuration instruction, and adjusts the shutdown threshold of the network node A based on a shutdown threshold required by the first network configuration instruction. The network node A in the target network node set executes the first network configuration instruction, so that the overall network energy saving effect and the overall network performance loss of the target network node set can meet the first network energy saving mode, and a relationship between the network energy saving effect and the network performance loss can be coordinated while network energy saving is implemented.

S258: The second network management unit obtains second service scenario information of the network node A in the target network node set.

In an energy saving operation process, network service data of the network node A in the target network node set may change, and the change of the network service data of the network node A in the target network node set may affect the network energy saving effect of the target network node set and the network performance loss of the target network node set, so that the network energy saving effect of the target network node set and the network performance loss of the target network node set cannot meet the first network energy saving mode. Therefore, the network node A in the target network node set may regularly or irregularly send second network service data to the second network management unit or the management unit of the network node A. Alternatively, when detecting that the network service data of the network node A changes, the network node A in the target network node set sends the second network service data to the second network management unit or the management unit of the network node A. The second network service data may be the same as or different from the first network service data.

The second network management unit obtains the second service scenario information of the network node A in the target network node set based on the second network service data.

For a specific implementation of this step, refer to step S255 in this embodiment. The second service scenario information may be the same as or different from the first service scenario information.

The second network management unit may determine, based on the obtained second service scenario information, not to send a further network configuration instruction to the network node A. For example, the second network management unit determines, based on the second service scenario information, that there is a small traffic volume change of the network node, and may keep the network configuration parameter delivered in the previous network configuration instruction unchanged, and the first network energy saving mode can still be met. Therefore, the second network management unit determines not to send a new network configuration instruction, and S259 and subsequent steps are not performed. It is assumed in the following that the second network management unit determines to send the further network configuration instruction to the network node A.

S259: The second network management unit determines a second network configuration parameter based on the first network energy saving mode and the second service scenario information, where the second network configuration parameter is for enabling the network node A to operate in an energy saving working state.

For a specific implementation of this step, refer to step S256 in this embodiment. The second network configuration parameter may be the same as or different from the first network configuration parameter.

S260: The second network management unit sends a second network configuration instruction to the network node A or the management unit of the network node A, where the second network configuration instruction includes the second network configuration parameter. Correspondingly, the network node or the management unit of the network node receives the second network configuration instruction.

For a specific implementation of this step, refer to step S257 in this embodiment.

S261: The network node A executes the second network configuration instruction.

For a specific implementation of this step, refer to step S268 in this embodiment.

S262: The network node A sends energy consumption data and/or network performance data of the network node A to the second network management unit or the management unit of the network node A.

Specifically, after delivering the first network configuration instruction/second network configuration instruction, the second network management unit may collect data from the network node A, to obtain energy consumption and/or network performance of the network node A in the target network node set after the network node A executes the first network configuration instruction and/or the second network configuration instruction. Specifically, in an implementation, the second network management unit may send an obtaining request to the network node A in the target network node set, to request to obtain the energy consumption and/or the network performance of the network node A after the network node A executes the first network configuration instruction and/or the second network configuration instruction. The network node A sends, to the second network management unit, the energy consumption and/or the network performance obtained after the network node A executes the first network configuration instruction and/or the second network configuration instruction. In another implementation, alternatively, after executing the first network configuration instruction/second network configuration instruction, the network node A may send the energy consumption and/or the network performance of the network node to the second network management unit.

It may be understood that after the second network management unit delivers the first network configuration instruction and the second network configuration instruction, and the network node A in the target network node set executes the first network configuration instruction and the second network configuration instruction, the network node A in the target network node set may send the energy consumption and/or the network performance of the network node A. Alternatively, after the second network management unit delivers a new network configuration instruction (that is, the first network configuration instruction or the second network configuration instruction) each time, and the network node A in the target network node set executes the network configuration instruction, the network node A in the target network node set sends the energy consumption and/or the network performance of the network node A.

Similarly, the second network management unit further obtains energy consumption data and/or network performance data of a network node other than the network node A in the target network node set.

S263: The second network management unit generates an energy saving control result based on energy consumption data and/or network performance data of all the network nodes in the target network node set.

After receiving the energy consumption data and/or the network performance data of the network nodes that are/is sent by all the network nodes in the target network node set, the second network management unit generates the energy saving control result based on the energy consumption data and/or the network performance data. The energy saving control result is a result of performing energy saving control on the target network node set.

Specifically, the second network management unit calculates a network energy saving effect of the target network node set based on the received energy consumption data of all the network nodes in the target network node set and historical energy consumption data that is of all the network nodes in the target network node set and that is recorded when energy saving control is not performed; and calculates a network performance loss of the target network node set based on the received network performance data of all the network nodes in the target network node set and historical network performance data that is of all network nodes in the target network node set and that is recorded when energy saving control is not performed. Then, the second network management unit parses the first network energy saving mode, and compares the obtained network performance loss and the obtained network energy saving effect of the target network node set with the first network energy saving mode based on the calculated network performance loss and the calculated network energy saving effect of the target network node set, to obtain the energy saving control result.

When the network energy saving effect of the target network node set is calculated, the energy consumption data of all the network nodes in the target network node set may be added (or added in a weighted manner), the historical energy consumption data that is of all the network nodes in the target network node set and that is recorded when energy saving control is not performed is added (or added in a weighted manner), and then the network energy saving effect of the target network node set is calculated based on two addition results.

When the network performance loss of the target network node set is calculated, the network performance data of all the network nodes in the target network node set may be averaged, the historical network performance data that is of all the network nodes in the target network node set and that is recorded when energy saving control is not performed is averaged, and then the network performance loss of the target network node set is calculated based on two average values.

Specifically, the energy saving control result includes information indicating whether the network energy saving effect of the target network node set and the network performance loss of the target network node set meet the first network energy saving mode, or information indicating a difference between the network energy saving effect of the target network node set and the network performance loss of the target network node set and the first network energy saving mode.

Whether the network energy saving effect of the target network node set and the network performance loss of the target network node set meet the first network energy saving mode includes two cases. In a first case, the network energy saving effect and the network performance loss meet the first network energy saving mode (or achieve an expectation). In a second case, the network energy saving effect and the network performance loss do not meet the first network energy saving mode (or do not achieve an expectation). Therefore, the information indicating whether the network energy saving effect of the target network node set and the network performance loss of the target network node set meet the first network energy saving mode may be one bit. When a value of the bit is "1", it indicates the foregoing first case. When a value of the bit is "0", it indicates the foregoing second case. When a value of the bit is "1", it indicates the foregoing second case. When a value of the bit is "0", it indicates the foregoing first case. For example, assuming that the first network energy saving mode includes a range (for example, an upper limit) of a ratio of a network performance loss to a corresponding network energy saving effect, the second network management unit separately calculates the network performance loss and the network energy saving effect based on the received energy consumption and/or the received network performance of the target network node set, calculates a ratio of the network performance loss to the network energy saving effect, then determines whether the calculated ratio falls within the range of the ratio included in the first network energy saving mode, and if the calculated ratio falls within the range of the ratio included in the first network energy saving mode, may determine that the network energy saving effect and the network performance loss meet the first network energy saving mode.

The difference between the network energy saving effect of the target network node set and the network performance loss of the target network node set and the first network energy saving mode may also include two cases. In a first case, the difference between the network energy saving effect of the target network node set and the network performance loss of the target network node set and the first network energy saving mode is greater than or equal to a preset threshold. In a second case, the difference between the network energy saving effect of the target network node set and the network performance loss of the target network node set and the first network energy saving mode is less than the preset threshold. The difference may be indicated by using one bit. When a value of the bit is "1", it indicates the foregoing first case. When a value of the bit is "0", it indicates the foregoing second case. When a value of the bit is "1", it indicates the foregoing second case. When a value of the bit is "0", it indicates the foregoing first case. The preset threshold may be set based on experience or historical data. Assuming that the first network energy saving mode includes a range (for example, an upper limit) of a ratio of a network performance loss to a corresponding network energy saving effect, the second network management unit separately calculates the network performance loss and the network energy saving effect based on the received energy consumption and/or the received network performance of the target network node set, calculates a ratio of the network performance loss to the network energy saving effect, calculates a difference between the ratio and the upper limit that is included in the first network energy saving mode, and then compares whether the difference is greater than or equal to the preset threshold.

S264: The second network management unit sends the energy saving control result to the first network management unit. Correspondingly, the first network management unit receives the energy saving control result.

The second network management unit sends the energy saving control result to the first network management unit. In an implementation, the second network management unit may send an energy saving feedback message to the first network management unit. The energy saving feedback message includes the energy saving control result. Correspondingly, the first network management unit receives the energy saving feedback message.

Further, the second network management unit may further update the foregoing scenario-based association relationship model between the network energy saving mode and the network configuration parameter based on the energy saving control result.

S265: The first network management unit sends a second energy saving control message to the second network management unit based on the energy saving control result, where the second energy saving control message includes a second network energy saving mode, and the second network energy saving mode indicates a second requirement on the network energy saving effect of the target network node set and the network performance loss of the target network node set.

Specifically, after the first network management unit receives a network energy saving mode execution result sent by the second network management unit, if the network energy saving mode execution result is that the network energy saving effect and the network performance loss do not meet the first network energy saving mode, or the difference between the first network energy saving mode and a relationship between the network energy saving effect and the network performance loss is greater than or equal to the preset threshold, the first network management unit obtains the second network energy saving mode based on the energy saving control result, where the second network energy saving mode indicates the second requirement on the network energy saving effect of the target network node set and the network performance loss of the target network node set.

For example, it is assumed that the first network energy saving mode is a performance-slightly lossy mode, where a specific requirement of the first network energy saving mode includes a range (for example, an upper limit 10%) of a ratio of a network performance loss to a corresponding network energy saving effect. After the target network node executes the first network configuration instruction, if the energy saving control result of the target network node is that the network energy saving effect of the target network node set and the network performance loss of the target network node set do not meet the first network energy saving mode, the first network energy saving mode needs to be adjusted to the second network energy saving mode, for example, a performance-lossless network energy saving mode.

Then, the first network management unit sends the second energy saving control message to the second network management unit, where the second energy saving control message includes the second network energy saving mode. Correspondingly, the second network management unit receives the second energy saving control message.

For a specific implementation of this step, refer to step S142 in the embodiment shown in FIG. 4 or step S253 in this embodiment. A difference lies in that when the second energy saving control message is delivered, network energy saving scope information may be the same as or different from the network energy saving scope information in the first energy saving control message. If the network energy saving scope information in the second energy saving control message is different from the network energy saving scope information in the first energy saving control message, the second energy saving control message may further include updated network energy saving scope information.

For example, assuming that the geographic location, included in the network energy saving scope information, of the network node that is to perform the energy saving operation in the first energy saving control message is "Haidian District", a network node in Haidian District is determined as a member of the target network node set. However, if the energy saving control result fed back by the second network management unit is that the network energy saving effect of the target network node set and the network performance loss of the target network node set do not meet the first network energy saving mode, the first network management unit may re-determine network energy saving scope information. For example, the geographic location, included in the determined network energy saving scope information, of the network node that is to perform the energy saving operation is "an industrial park in Haidian District", that is, a network energy saving scope is narrowed (it is assumed that narrowing the network energy saving scope can improve the network energy saving effect). In this case, a network node in the industrial park in Haidian District is determined as a member of the target network node set. The second energy saving control message includes the re-determined network energy saving scope information.

S266: The second network management unit triggers, based on the second energy saving control message, the target network node set to perform the energy saving operation, so that the relationship between the energy saving effect and the network performance loss of the target network node set meets the second network energy saving mode.

For a specific implementation of this step, refer to the foregoing steps S254 to S265. During implementation of steps S264 to S266, the first network management unit may further adjust, based on the energy saving control result fed back by the second network management unit, the network energy saving mode delivered to the second network management unit, so that the network energy saving effect of the target network node set and the network performance loss of the target network node set meet the delivered network energy saving mode as much as possible.

According to the network energy saving management method provided in this embodiment of this disclosure, after receiving the first energy saving control message sent by the first network management unit, the second network management unit may deliver different network configuration parameters based on the first network energy saving mode and different service scenarios of the network node. The first network management unit may further adjust, based on the energy saving control result fed back by the second network management unit, the network energy saving mode delivered to the second network management unit, so that network energy saving effect of the target network node set and the network performance loss of the target network node set meet the delivered network energy saving mode as much as possible.

Based on a same concept as the foregoing network energy saving management method, an embodiment of this disclosure further provides the following network energy saving management apparatus.

Figure 6:
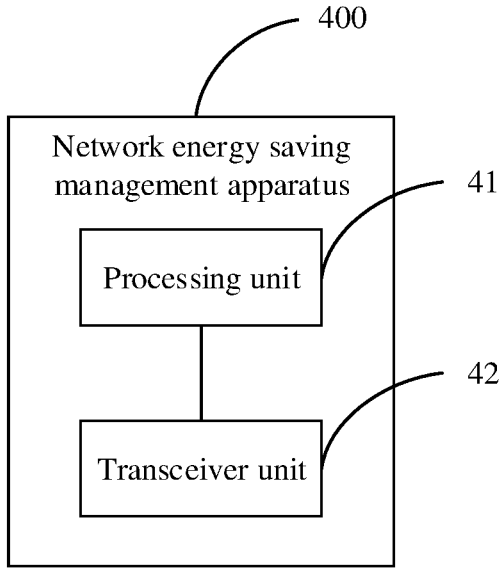
FIG. 6 is a schematic structural diagram of a network energy saving management apparatus according to an embodiment of this disclosure.

FIG. 6 is a schematic structural diagram of a network energy saving management apparatus according to an embodiment of this disclosure. The network energy saving management apparatus may be the foregoing first network management unit. The network energy saving management apparatus 400 includes a processing unit 41 and a transceiver unit 42.

The processing unit 41 is configured to determine network energy saving scope information and a first network energy saving mode, where the network energy saving scope information is for determining a target network node set, the target network node set includes one or more network nodes that are to perform an energy saving operation, and the first network energy saving mode indicates a first requirement on network energy saving effect of the target network node set and a network performance loss of the target network node set.

The transceiver unit 42 is configured to send a first energy saving control message to a second network management unit, where the first energy saving control message includes the network energy saving scope information and the first network energy saving mode.

Optionally, the transceiver unit 42 is further configured to receive an energy saving control result from the second network management unit, where the energy saving control result is a result of performing energy saving control on the target network node set.

Optionally, the transceiver unit 42 is further configured to receive an energy saving feedback message from the second network management unit, where the energy saving feedback message includes the energy saving control result.

Optionally, the transceiver unit 42 is further configured to send a second energy saving control message to the second network management unit based on the energy saving control result, where the second energy saving control message includes a second network energy saving mode, and the second network energy saving mode indicates a second requirement on the network energy saving effect of the target network node set and the network performance loss of the target network node set.

Optionally, the transceiver unit 42 is further configured to receive energy saving control capability information from the second network management unit, where the energy saving control capability information includes at least one network energy saving mode supported by the second network management unit.

The processing unit 41 is configured to select a network energy saving mode as the first network energy saving mode from the at least one network energy saving mode supported by the second network management unit.

For specific implementations of the processing unit 41 and the transceiver unit 42, refer to the related descriptions of the first network management unit in the embodiment shown in FIG. 4 or FIG. 5A and FIG. 5B.

According to the network energy saving management apparatus provided in this embodiment of this disclosure, the apparatus delivers the first energy saving control message to the second network management unit, so that the second network management unit triggers, based on the first energy saving control message, the target network node set to perform the energy saving operation. Therefore, the network energy saving effect and the network performance loss can continuously meet a specified requirement, and a telecommunications operator can balance a relationship between the network energy saving effect and the network performance loss in general.

Figure 7:
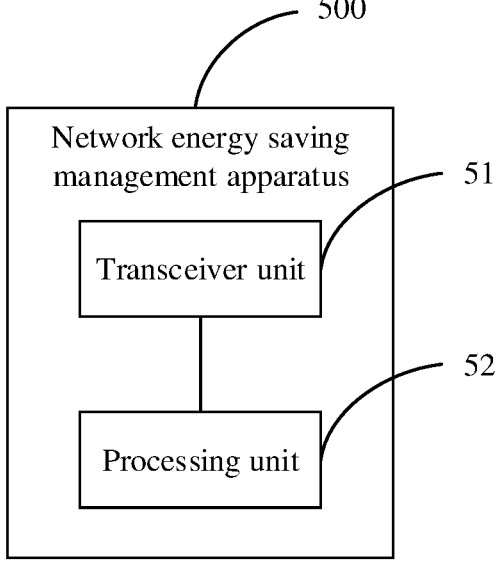
FIG. 7 is a schematic structural diagram of another network energy saving management apparatus according to an embodiment of this disclosure.

FIG. 7 is a schematic structural diagram of another network energy saving management apparatus according to an embodiment of this disclosure. The network energy saving management apparatus may be the foregoing second network management unit. The network energy saving management apparatus 500 includes a transceiver unit 51 and a processing unit 52.

The transceiver unit 51 is configured to receive a first energy saving control message sent by a first network management unit, where the first energy saving control message includes network energy saving scope information and a first network energy saving mode, the network energy saving scope information is for determining a target network node set, the target network node set includes one or more network nodes that are to perform an energy saving operation, and the first network energy saving mode indicates a first requirement on network energy saving effect of the target network node set and a network performance loss of the target network node set.

The processing unit 52 is configured to trigger, based on the first energy saving control message, the target network node set to perform the energy saving operation, so that the network energy saving effect of the target network node set and the network performance loss of the target network node set meet the first network energy saving mode.

Optionally, the transceiver unit 51 is further configured to forward the first energy saving control message to a network management unit of the target network node set.

Optionally, the processing unit 52 is further configured to obtain first service scenario information of the network node in the target network node set.

The processing unit 52 is further configured to determine a first network configuration parameter based on the first network energy saving mode and the first service scenario information, where the first network configuration parameter is for enabling the network node in the target network node set to operate in an energy saving working state.

The transceiver unit 51 is further configured to send a first network configuration instruction to the network node in the target network node set or a management unit of the network node in the target network node set, where the first network configuration instruction includes the first network configuration parameter.

Optionally, the transceiver unit 51 is further configured to receive first network service data sent by the network node in the target network node set, where the first network service data includes a network configuration, a network topology, and network performance. The processing unit 52 is further configured to obtain the first service scenario information based on the first network service data.

Optionally, the processing unit 52 is further configured to determine the first network configuration parameter based on the first network energy saving mode, the first service scenario information, and a pre-stored association relationship among service scenario information, a network energy saving mode, and a network configuration parameter.

Optionally, the processing unit 52 is further configured to obtain second service scenario information of the network node in the target network node set.

The processing unit 52 is further configured to determine a second network configuration parameter based on the first network energy saving mode and the second service scenario information, where the second network configuration parameter is for enabling the network node in the target network node set to operate in the energy saving working state.

The transceiver unit 51 is further configured to send a second network configuration instruction to the network node in the target network node set or the management unit of the network node in the target network node set, where the second network configuration instruction includes the second network configuration parameter.

Optionally, the transceiver unit 51 is further configured to send energy saving control capability information to the first network management unit, where the energy saving control capability information includes at least one network energy saving mode supported by the second network management unit.

Optionally, the transceiver unit 51 is further configured to send an energy saving control result to the first network management unit, where the energy saving control result is a result of performing energy saving control on the target network node set.

Optionally, the transceiver unit 51 is further configured to send an energy saving feedback message to the first network management unit, where the energy saving feedback message includes the energy saving control result.

Optionally, the transceiver unit 51 is further configured to receive a second energy saving control message sent by the first network management unit, where the second energy saving control message includes a second network energy saving mode, and the second network energy saving mode indicates a second requirement on the network energy saving effect of the target network node set and the network performance loss of the target network node set.

The processing unit 52 is further configured to trigger, based on the second energy saving control message, the target network node set to perform the energy saving operation, so that the network energy saving effect of the target network node set and the network performance loss of the target network node set meet the second network energy saving mode.

For specific implementations of the transceiver unit 51 and the processing unit 52, refer to the related descriptions of the second network management unit in the embodiment shown in FIG. 4 or FIG. 5A and FIG. 5B.

According to the network energy saving management apparatus provided in this embodiment of this disclosure, the apparatus triggers, based on the first energy saving control message delivered by the first network management unit, the target network node set to perform the energy saving operation. Therefore, the network energy saving effect and the network performance loss can continuously meet a specified requirement, and a telecommunications operator can balance a relationship between the network energy saving effect and the network performance loss in general.

Figure 8:
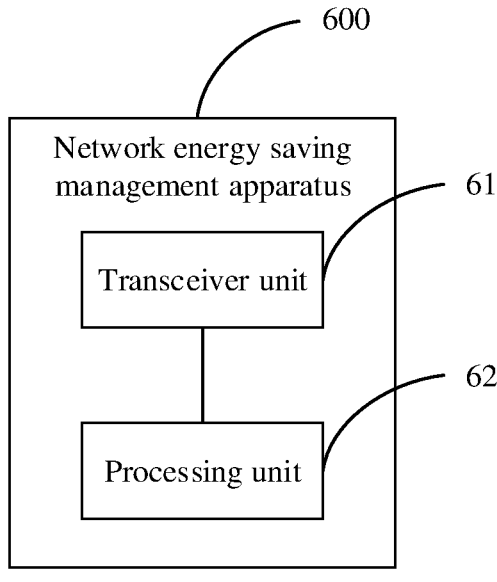
FIG. 8 is a schematic structural diagram of still another network energy saving management apparatus according to an embodiment of this disclosure.

FIG. 8 is a schematic structural diagram of still another network energy saving management apparatus according to an embodiment of this disclosure. The network energy saving management apparatus may be a network node in the foregoing target network node set. The network energy saving management apparatus 600 includes a transceiver unit 61 and a processing unit 62.

The transceiver unit 61 is configured to receive a first network configuration instruction from a second network management unit or a management unit of the network node, where the first network configuration instruction includes a first network configuration parameter, and the first network configuration parameter is for enabling the network node in the target network node set to operate in an energy saving working state.

The processing unit 62 is configured to execute the first network configuration instruction, so that network energy saving effect of the target network node set and a network performance loss of the target network node set meet a first network energy saving mode.

Optionally, the transceiver unit 61 is further configured to send first network service data to the second network management unit or the management unit of the network node, where the first network service data includes a network configuration, a network topology, and network performance.

Optionally, the transceiver unit 61 is further configured to send energy consumption and/or network performance of the network node to the second network management unit or the management unit of the network node.

For specific implementations of the transceiver unit 61 and the processing unit 62, refer to the related descriptions of the network node in the target network node set in the embodiment shown in FIG. 4 or FIG. 5A and FIG. 5B.

According to the network energy saving management apparatus provided in this embodiment of this disclosure, the apparatus receives the network configuration instruction sent by the second network management unit or the network management unit of the target network node, and executes the network configuration instruction. Therefore, the network energy saving effect and the network performance loss can continuously meet a specified requirement, and a telecommunications operator can balance a relationship between the network energy saving effect and the network performance loss in general.

Figure 9:
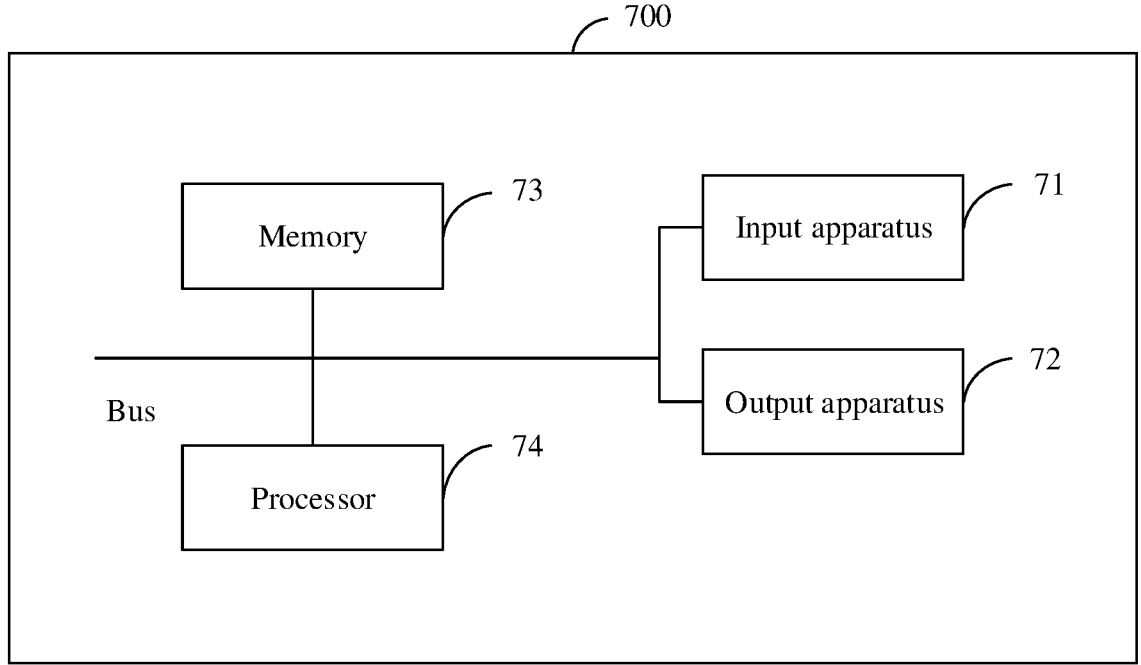
FIG. 9 is a schematic structural diagram of yet another network energy saving management apparatus according to an embodiment of this disclosure.

FIG. 9 further provides a schematic structural diagram of a network energy saving management apparatus. The network energy saving management apparatus is configured to perform the foregoing network energy saving management method. A part or all of the foregoing method may be implemented by using hardware, or may be implemented by using software or firmware.

Optionally, during specific implementation, the network energy saving management apparatus may be a chip or an integrated circuit.

Optionally, when a part or all of the network energy saving management method in the foregoing embodiment is implemented by using software or firmware, a network energy saving management apparatus 700 provided in FIG. 9 may be used for implementation. As shown in FIG. 9, the network energy saving management apparatus 700 may include:

a memory 73 and a processor 74 (where there may be one or more processors 74 in the apparatus, and one processor is used as an example in FIG. 9), and may further include an input apparatus 71 and an output apparatus 72, where in this embodiment, the input apparatus 71, the output apparatus 72, the memory 73, and the processor 74 may be connected by using a bus or in another manner, and FIG. 9 uses an example in which a connection is implemented by using a bus.

In an embodiment, the network energy saving management apparatus is a first network management unit, the processor 74 is configured to perform step S141 in the embodiment shown in FIG. 4, and the output apparatus 72 is configured to perform an operation performed by the first network management unit in step S142 in FIG. 4.

In another embodiment, the network energy saving management apparatus is a second network management unit, the input apparatus 71 is configured to perform an operation performed by the second network management unit in step S142 in the embodiment shown in FIG. 4, and the output apparatus 72 is configured to perform an operation performed by the second network management unit in step S143 in the embodiment shown in FIG. 4.

In still another embodiment, the network energy saving management apparatus is a network node in a target network node set, and the input apparatus 71 is configured to perform an operation performed by the network node in step S143 in the embodiment shown in FIG. 4.

In yet another embodiment, the network energy saving management apparatus is a first network management unit. The input apparatus 71 is configured to perform operations performed by the first network management unit in steps S251 and S264 in the embodiment shown in FIG. 5A and FIG. 5B. The processor 74 is configured to perform step S252 in the embodiment shown in FIG. 5A and FIG. 5B. The output apparatus 72 is configured to perform operations performed by the first network management unit in steps S253 and S265 in the embodiment shown in FIG. 5A and FIG. 5B.

In still yet another embodiment, the network energy saving management apparatus is a second network management unit. The output apparatus 72 is configured to perform operations performed by the second network management unit in steps S251, S256, S260, S264, and S266 in the embodiment shown in FIG. 5A and FIG. 5B. The input apparatus 71 is configured to perform operations performed by the second network management unit in steps S253, S262, and S265 in the embodiment shown in FIG. 5A and FIG. 5B. The processor 74 is configured to perform steps S254, S255, S258, S259, and S263 in the embodiment shown in FIG. 5A and FIG. 5B.

In a further embodiment, the network energy saving management apparatus is a network node in a target network node set. The output apparatus 72 is configured to perform an operation performed by the network node in the target network node in step S212 in the embodiment shown in FIG. 5A and FIG. 5B. The input apparatus 71 is configured to perform operations performed by the network node in the target network node in steps S256, S260, and S266 in the embodiment shown in FIG. 5A and FIG. 5B. The processor 74 is configured to perform steps S257 and S261 in the embodiment shown in FIG. 5A and FIG. 5B.

Optionally, a program of the network energy saving management method may be stored in the memory 73. The memory 73 may be a physically independent unit, or may be integrated with the processor 74. The memory 73 may also be configured to store data.

Optionally, when a part or all of the network energy saving management method in the foregoing embodiment is implemented by using software, the network energy saving management apparatus may alternatively include only the processor. The memory configured to store the program is located outside the network energy saving management apparatus. The processor is connected to the memory by using a circuit or a wire, and is configured to read and execute the program stored in the memory.

The processor may be a central processing unit (central processing unit, CPU), a network processor (network processor, NP), or a WLAN device. The processor may further include a hardware chip. The foregoing hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable logic gate array (field-programmable gate array, FPGA), a generic array logic (generic array logic, GAL), or any combination thereof.

The memory may include a volatile memory (volatile memory), for example, a random-access memory (random-access memory, RAM). The memory may also include a non-volatile memory (non-volatile memory), for example, a flash memory (flash memory), a hard disk drive (hard disk drive, HDD), or a solid-state drive (solid-state drive, SSD). The memory may further include a combination of the foregoing types of memories.

A person skilled in the art should understand that one or more embodiments of this disclosure may be provided as a method, a system, or a computer program product. Therefore, the one or more embodiments of this disclosure may use a form of hardware only embodiments, software only embodiments, or embodiments with a combination of software and hardware. In addition, the one or more embodiments of this disclosure may use a form of a computer program product that is implemented on one or more computer-usable storage media (including but not limited to a magnetic disk memory, a CD-ROM, an optical memory, and the like) that include computer-usable program code.

An embodiment of this disclosure further provides a chip system, including at least one processor and an interface. The at least one processor is coupled to a memory through the interface. When the at least one processor executes a computer program or instructions in the memory, the method in any one of the foregoing method embodiments is performed. Optionally, the chip system may include a chip, or may include a chip and another discrete component. This is not specifically limited in this embodiment of this disclosure.

An embodiment of this disclosure further provides a computer-readable storage medium. The storage medium may store a computer program. When the program is executed by a processor, steps of a network energy saving management method described in any embodiment of this disclosure are implemented.

An embodiment of this disclosure further provides a computer program product including instructions. When the computer program product runs on a computer, the computer is enabled to perform steps of a network energy saving management method described in any embodiment of this disclosure.

An embodiment of this disclosure further provides a network energy saving management system. The network energy saving management system includes the foregoing network energy saving management apparatus.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

It should be understood that unless otherwise specified, "/" in descriptions of this disclosure represents an "or" relationship between associated objects. For example, AB may represent A or B. A and B may be singular or plural. In addition, in the descriptions of this disclosure, "a plurality of" means two or more than two, unless otherwise specified. "At least one item (piece) of the following" or a similar expression thereof means any combination of these items, including any combination of singular items (pieces) or plural items (pieces). For example, at least one (piece) of a, b, or c may represent: a, b, c; a and b; a and c; b and c; or a, b, and c; where a, b, and c may be singular or plural. In addition, to clearly describe the technical solutions in embodiments of this disclosure, terms such as "first" and "second" are used in embodiments of this disclosure to distinguish between same items or similar items whose functions and purposes are basically the same. A person skilled in the art may understand that the terms such as "first" and "second" do not limit a quantity or an execution sequence, and the terms such as "first" and "second" do not indicate a definite difference. In addition, in embodiments of this disclosure, the word such as "example" or "for example" is used to represent giving an example, an illustration, or a description. Any embodiment or design scheme described as an "example" or "for example" in embodiments of this disclosure shall not be explained as being more preferred or having more advantages than another embodiment or design scheme. Exactly, use of the word "example", "for example", or the like is intended to present a relative concept in a specific manner for ease of understanding.

In the several embodiments provided in this disclosure, it should be understood that the disclosed system, apparatus, and method may be implemented in other manners. For example, division into units is merely logical function division and may be other division during actual implementation. For example, a plurality of units or components may be combined or integrated into another system, or some features may be ignored or not performed. The displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in embodiments.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on a computer, the procedure or functions according to embodiments of this disclosure are all or partially generated. The computer may be a general-purpose computer, a dedicated computer, a computer network, or another programmable apparatus. The computer instructions may be stored in a computer-readable storage medium, or may be transmitted by using a computer-readable storage medium. The computer instructions may be transmitted from a website, computer, server, or data center to another web site, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible to a computer, or a data storage device, such as a server or a data center, integrating one or more usable media. The usable medium may be a read-only memory (read-only memory, ROM), a random access memory (random access memory, RAM), or a magnetic medium, for example, a floppy disk, a hard disk, a magnetic tape, a magnetic disk, or an optical medium, for example, a digital versatile disc (digital versatile disc, DVD), or a semiconductor medium, for example, a solid-state drive (solid-state drive, SSD).

What is claimed is:

1. A network energy saving management method, comprising:

determining network energy saving scope information and a first network energy saving mode, wherein the network energy saving scope information is for determining a target network node set, the target network node set comprises one or more network nodes that are to perform an energy saving operation, and the first network energy saving mode indicates a first requirement on a network energy saving effect of the target network node set and a network performance loss of the target network node set, wherein the network energy saving scope information comprises at least one of the following: a geographic location of a network node that is to perform an energy saving operation; or a network standard of the network node that is to perform the energy saving operation; and sending a first energy saving control message, wherein the first energy saving control message comprises the network energy saving scope information and the first network energy saving mode.

2. The method according to claim 1, wherein the network energy saving scope information comprises a network service supported by the network node that is to perform the energy saving operation.

3. The method according to claim 1, wherein the method further comprises:

receiving an energy saving control result, wherein the energy saving control result is a result of performing energy saving control on the target network node set.

4. The method according to claim 3, wherein the energy saving control result comprises:

information indicating whether the network energy saving effect of the target network node set and the network performance loss of the target network node set meet the first network energy saving mode, or information indicating a difference between the network energy saving effect of the target network node set and the network performance loss of the target network node set and the first network energy saving mode.

5. The method according to claim 1, wherein:

the method further comprises: receiving energy saving control capability information, wherein the energy saving control capability information comprises at least one network energy saving mode supported by a network management unit; and the determining a first network energy saving mode comprises: selecting a network energy saving mode as the first network energy saving mode from the at least one network energy saving mode supported by the network management unit.

6. The method according to claim 1, wherein the first network energy saving mode comprises:

a value range of a network energy saving effect and a value range of a corresponding network performance loss, or a value range of a ratio of a network energy saving effect to a network performance loss.

7. The method according to claim 1, wherein the network energy saving scope information and the first network energy saving mode are determined by a first network management unit, and the first energy saving control message is sent by the first network management unit, wherein the first network management unit is a network management system, a cross-domain network management unit, or a business support system.

8. A network energy saving management method, comprising:

receiving a first energy saving control message, wherein the first energy saving control message comprises network energy saving scope information and a first network energy saving mode, the network energy saving scope information is for determining a target network node set, the target network node set comprises one or more network nodes that are to perform an energy saving operation, and the first network energy saving mode indicates a first requirement on network energy saving effect of the target network node set and a network performance loss of the target network node set, wherein the network energy saving scope information comprises at least one of the following: a geographic location of a network node that is to perform an energy saving operation; or a network standard of the network node that is to perform the energy saving operation; and triggering, based on the first energy saving control message, the target network node set to perform the energy saving operation, wherein the energy saving operation causes the network energy saving effect of the target network node set and the network performance loss of the target network node set to meet the first network energy saving mode.

9. The method according to claim 8, wherein the network energy saving scope information comprises a network service supported by the network node that is to perform the energy saving operation.

10. The method according to claim 8, wherein the triggering, based on the first energy saving control message, the target network node set to perform the energy saving operation comprises:

forwarding the first energy saving control message to a network management unit of the target network node set.

11. The method according to claim 8, wherein the triggering, based on the first energy saving control message, the target network node set to perform the energy saving operation comprises:

obtaining first service scenario information of the network node in the target network node set;

determining a first network configuration parameter based on the first network energy saving mode and the first service scenario information, wherein the first network configuration parameter is for enabling the network node in the target network node set to operate in an energy saving working state; and sending a first network configuration instruction to the network node in the target network node set or a management unit of the network node in the target network node set, wherein the first network configuration instruction comprises the first network configuration parameter.

12. The method according to claim 11, wherein the obtaining first service scenario information of the network node in the target network node set comprises:

receiving first network service data sent by the network node in the target network node set, wherein the first network service data comprises a network configuration, a network topology, and network performance; and obtaining the first service scenario information based on the first network service data.

13. The method according to claim 11, wherein the determining a first network configuration parameter based on the first network energy saving mode and the first service scenario information comprises:

determining the first network configuration parameter based on the first network energy saving mode, the first service scenario information, and a pre-stored association relationship among service scenario information, a network energy saving mode, and a network configuration parameter.

14. The method according to claim 10, wherein the triggering, based on the first energy saving control message, the target network node set to perform the energy saving operation further comprises:

obtaining second service scenario information of the network node in the target network node set;

determining a second network configuration parameter based on the first network energy saving mode and the second service scenario information, wherein the second network configuration parameter is for enabling the network node in the target network node set to operate in the energy saving working state; and sending a second network configuration instruction to the network node in the target network node set or the management unit of the network node in the target network node set, wherein the second network configuration instruction comprises the second network configuration parameter.

15. The method according to claim 8, wherein before the receiving a first energy saving control message, the method further comprises:

sending energy saving control capability information, wherein the energy saving control capability information comprises at least one network energy saving mode supported by a network management unit.

16. The method according to claim 8, wherein the first network energy saving mode comprises:

a value range of a network energy saving effect and a value range of a corresponding network performance loss, or a value range of a ratio of a network energy saving effect to a network performance loss.

17. The method according to claim 8, wherein the method further comprises:

sending an energy saving control result, wherein the energy saving control result is a result of performing energy saving control on the target network node set.

18. The method according to claim 17, wherein the sending an energy saving control result comprises:

sending an energy saving feedback message, wherein the energy saving feedback message comprises the energy saving control result.

19. The method according to claim 17, wherein the energy saving control result comprises:

information indicating whether the network energy saving effect of the target network node set and the network performance loss of the target network node set meet the first network energy saving mode, or information indicating a difference between the network energy saving effect of the target network node set and the network performance loss of the target network node set and the first network energy saving mode.

20. A first network management unit, comprising:

at least one processor; and one or more non-transitory computer-readable storage media coupled to the at least one processor and storing programming instructions for execution by the at least one processor, wherein the programming instructions, when executed, cause the first network management unit to perform operations comprising:

determining network energy saving scope information and a first network energy saving mode, wherein the network energy saving scope information is for determining a target network node set, the target network node set comprises one or more network nodes that are to perform an energy saving operation, and the first network energy saving mode indicates a first requirement on a network energy saving effect of the target network node set and a network performance loss of the target network node set, wherein the network energy saving scope information comprises at least one of the following: a geographic location of a network node that is to perform an energy saving operation; or a network standard of the network node that is to perform the energy saving operation; and sending a first energy saving control message, wherein the first energy saving control message comprises the network energy saving scope information and the first network energy saving mode.

* * * * *